US011159878B1

(12) United States Patent
Chatlani et al.

(10) Patent No.: US 11,159,878 B1
(45) Date of Patent: Oct. 26, 2021

(54) AUTONOMOUSLY MOTILE DEVICE WITH BEAMFORMING

(71) Applicant: Amazon Technologies, Inc., Seattle, WA (US)

(72) Inventors: Navin Chatlani, Palo Alto, CA (US); Amit Chhetri, Sunnyvale, CA (US); Ananth Raghavendra, Waltham, MA (US); Srivatsan Kandadai, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/541,943

(22) Filed: Aug. 15, 2019

(51) Int. Cl.
*H04R 3/00* (2006.01)
*H04R 1/40* (2006.01)
*G06F 3/14* (2006.01)

(52) U.S. Cl.
CPC ............... *H04R 3/005* (2013.01); *G06F 3/14* (2013.01); *H04R 1/406* (2013.01); *H04R 2201/401* (2013.01)

(58) Field of Classification Search
CPC ............ H04R 3/005; H04R 1/406; G06F 3/14
See application file for complete search history.

(56) References Cited

U.S. PATENT DOCUMENTS

| 6,222,432 B1* | 4/2001 | Wegdal | H01P 7/04 333/203 |
| 6,311,638 B1* | 11/2001 | Ishii | C23C 16/511 118/723 E |
| 2004/0061607 A1* | 4/2004 | Pargman | G08B 1/08 340/539.15 |
| 2005/0245234 A1* | 11/2005 | Stopek | H04B 1/3833 455/411 |
| 2007/0077890 A1* | 4/2007 | Drabeck | H04B 17/3912 455/67.11 |
| 2010/0220818 A1* | 9/2010 | Yamamoto | H04N 21/44016 375/340 |
| 2012/0062441 A1* | 3/2012 | Peiker | H04B 1/3822 343/912 |
| 2012/0176276 A1* | 7/2012 | Amari | H01Q 1/243 343/700 MS |
| 2015/0026737 A1* | 1/2015 | Miller | H01Q 3/08 725/72 |
| 2016/0111789 A1* | 4/2016 | Chang | H01Q 1/243 343/702 |
| 2016/0345092 A1* | 11/2016 | Virolainen | H04R 1/08 |
| 2017/0245053 A1* | 8/2017 | Virolainen | H04S 7/40 |
| 2019/0058246 A1* | 2/2019 | Lee | H01Q 9/0457 |
| 2019/0379104 A1* | 12/2019 | Leung | H01Q 13/10 |
| 2020/0127382 A1* | 4/2020 | Lee | H01Q 9/145 |
| 2021/0057805 A1* | 2/2021 | Yang | H01Q 1/42 |

FOREIGN PATENT DOCUMENTS

JP            04014325 A    *  1/1992

* cited by examiner

*Primary Examiner* — Simon King
(74) *Attorney, Agent, or Firm* — Pierce Atwood LLP

(57) ABSTRACT

A device capable of moving a component of the device motion is capable of determining audio data corresponding to a direction relative to the device ("beamforming"). When the component moves, the device determines a new position of the component and selects one of a set of beamforming filter coefficients corresponding to the position. Using the filter coefficients, the device determines the directional audio data.

23 Claims, 18 Drawing Sheets

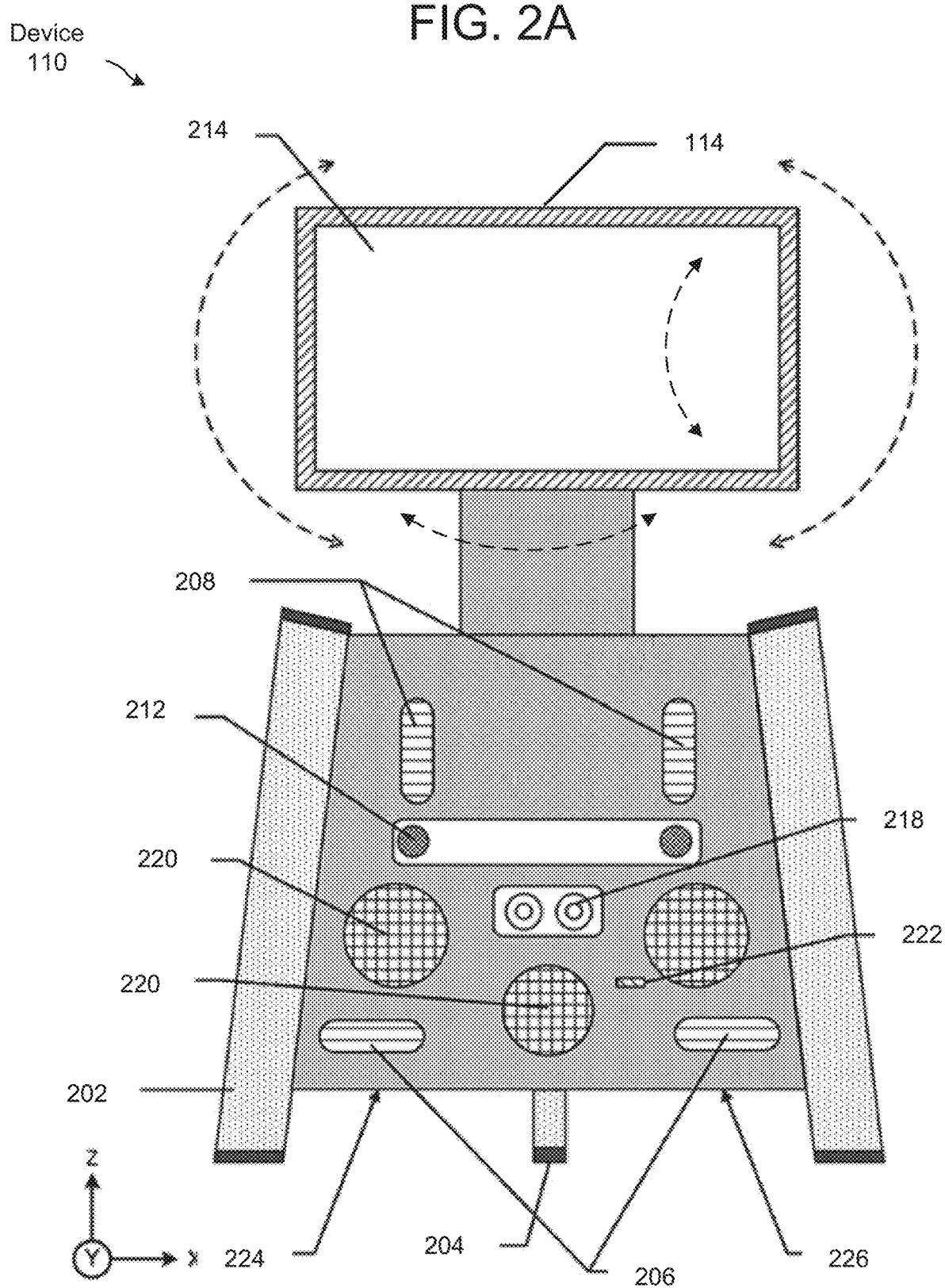

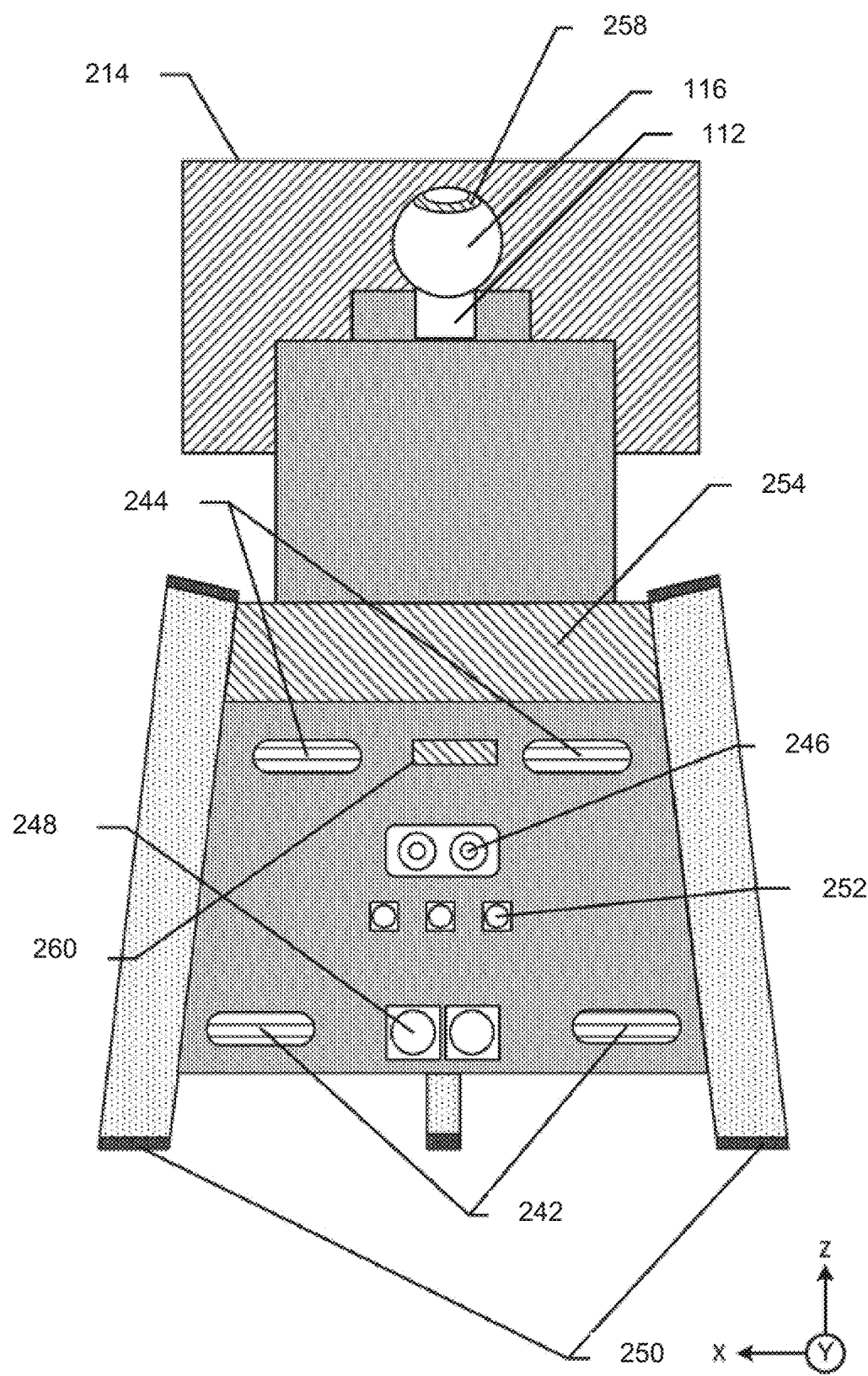

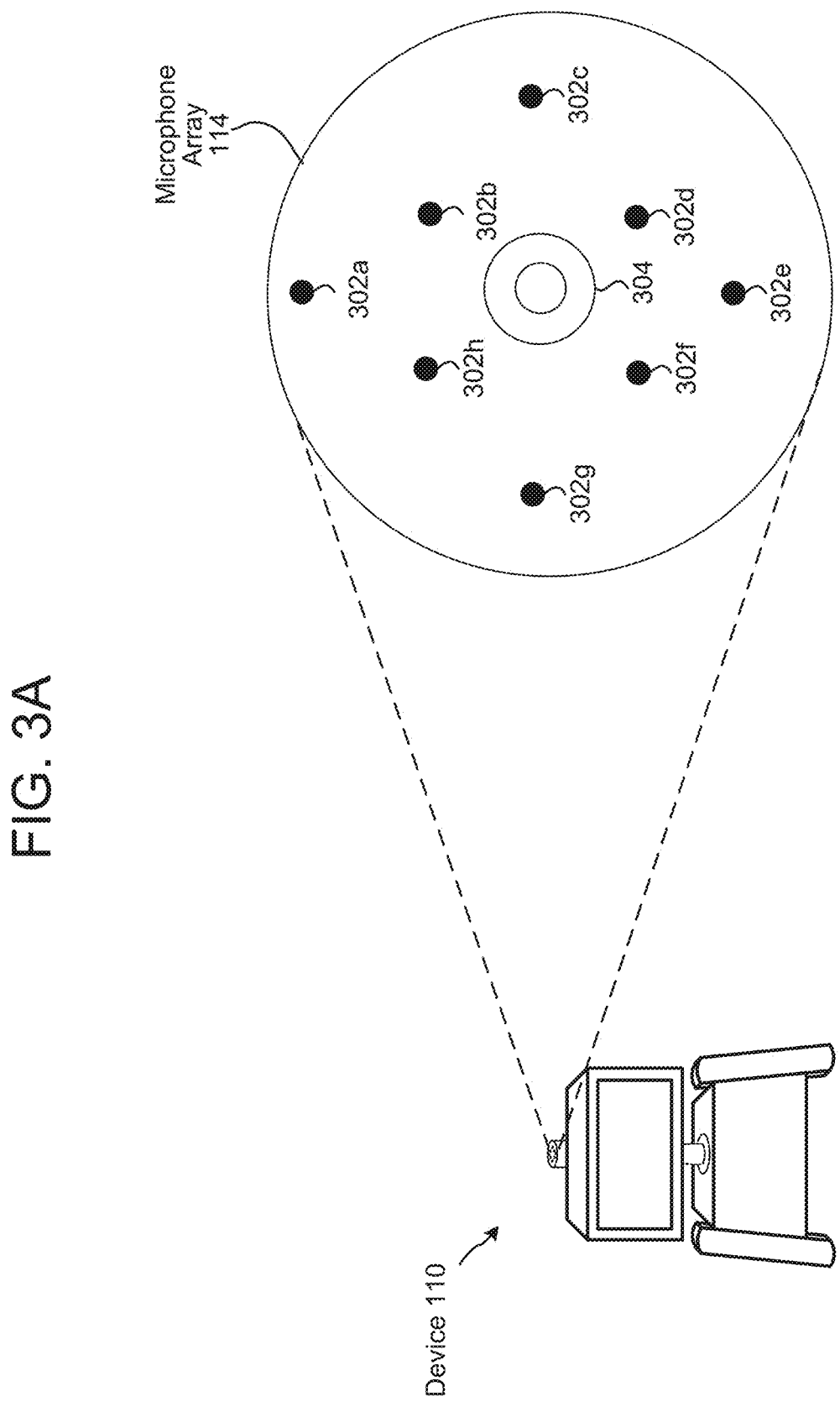

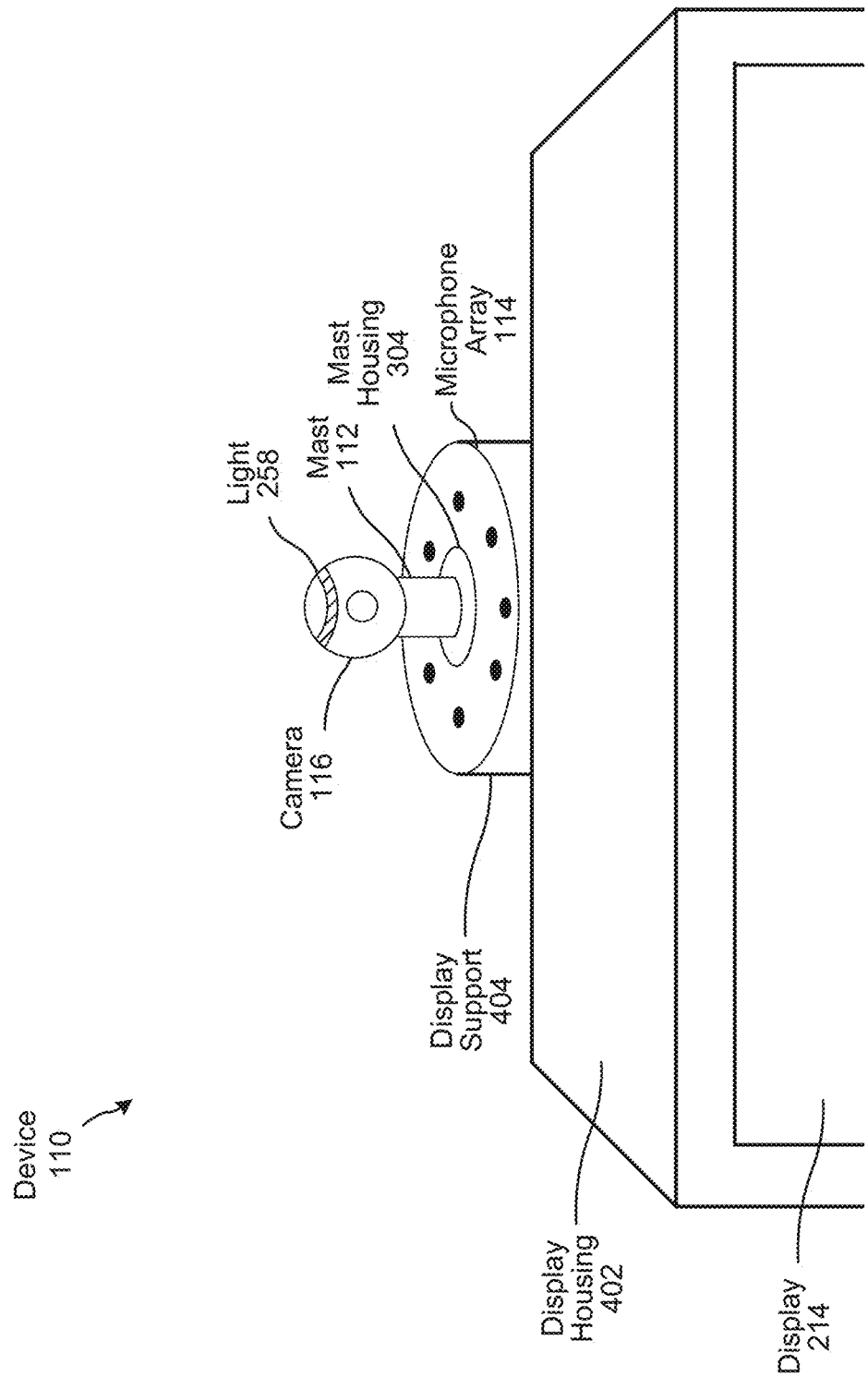

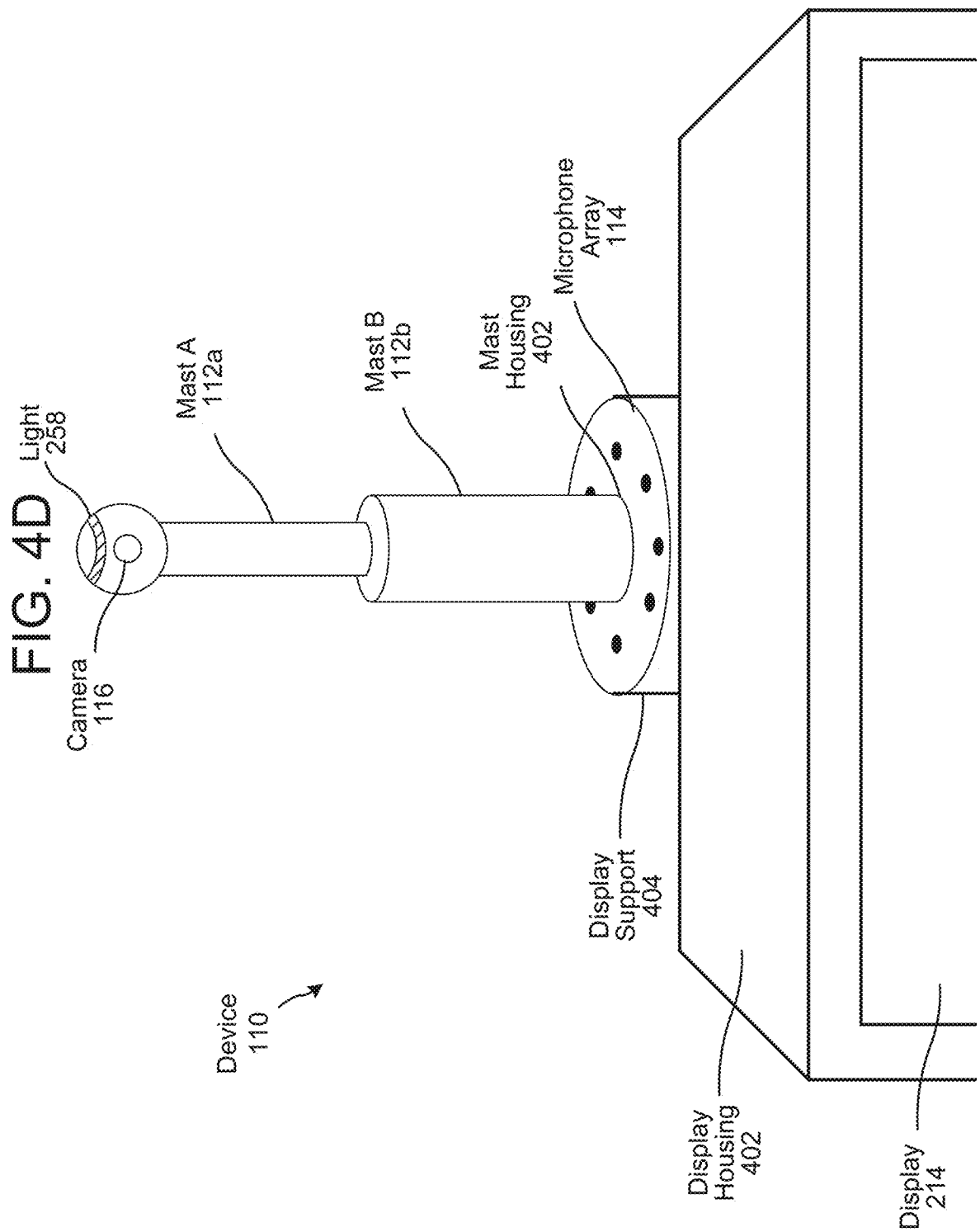

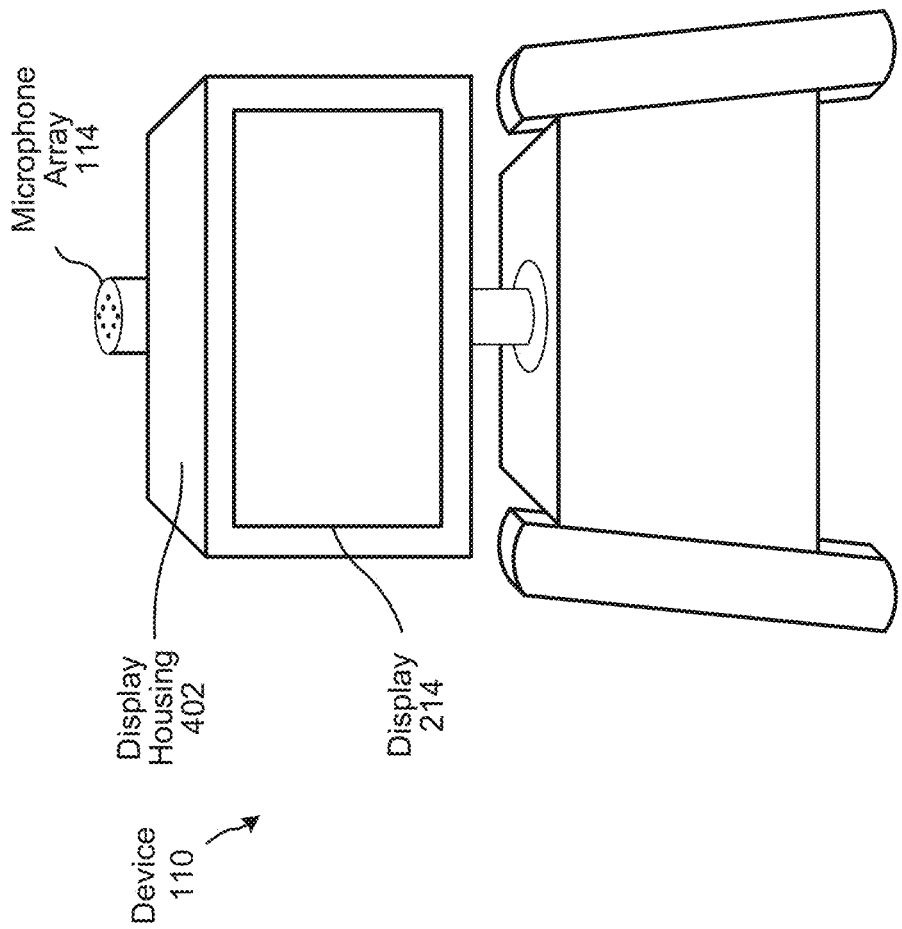

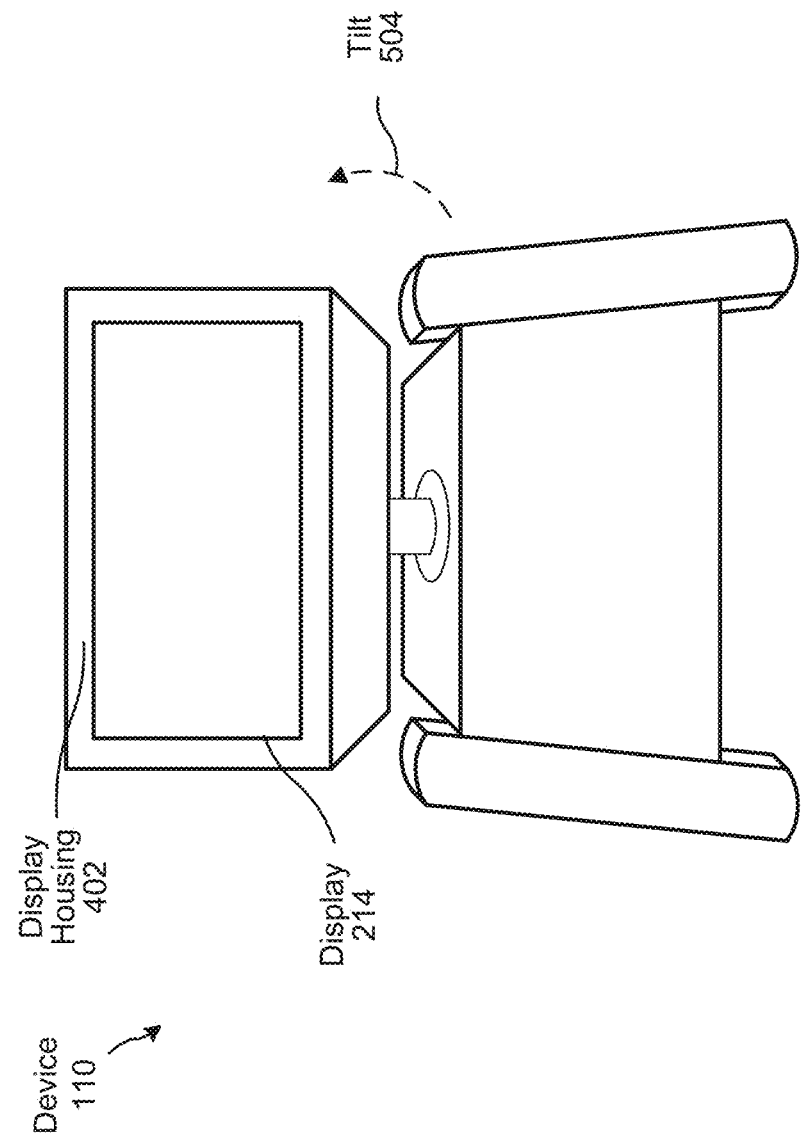

AUTONOMOUSLY MOTILE DEVICE WITH BEAMFORMING

BACKGROUND

In audio systems, beamforming refers to techniques that use a microphone array to isolate audio from particular directions into directional audio data—called beams—and then select one beam for further audio processing. Beamforming may further be used to filter out noise originating from other directions. Beamforming may be used for various tasks, including isolating voice commands to be executed by a speech-processing system.

BRIEF DESCRIPTION OF DRAWINGS

For a more complete understanding of the present disclosure, reference is now made to the following description taken in conjunction with the accompanying drawings.

FIGS. 2A, 2B, and 2C illustrate views of a device capable of moving a component of the device according to embodiments of the present disclosure.

FIGS. 3A, 3B, and 3C illustrate a microphone array capable of being used for beamforming according to embodiments of the present disclosure.

FIGS. 4A-4D illustrate an autonomously motile device capable of moving a component of the device according to embodiments of the present disclosure.

FIGS. 5A-5C illustrate an autonomously motile device capable of moving another component of the device according to embodiments of the present disclosure.

DETAILED DESCRIPTION

Figure 1:
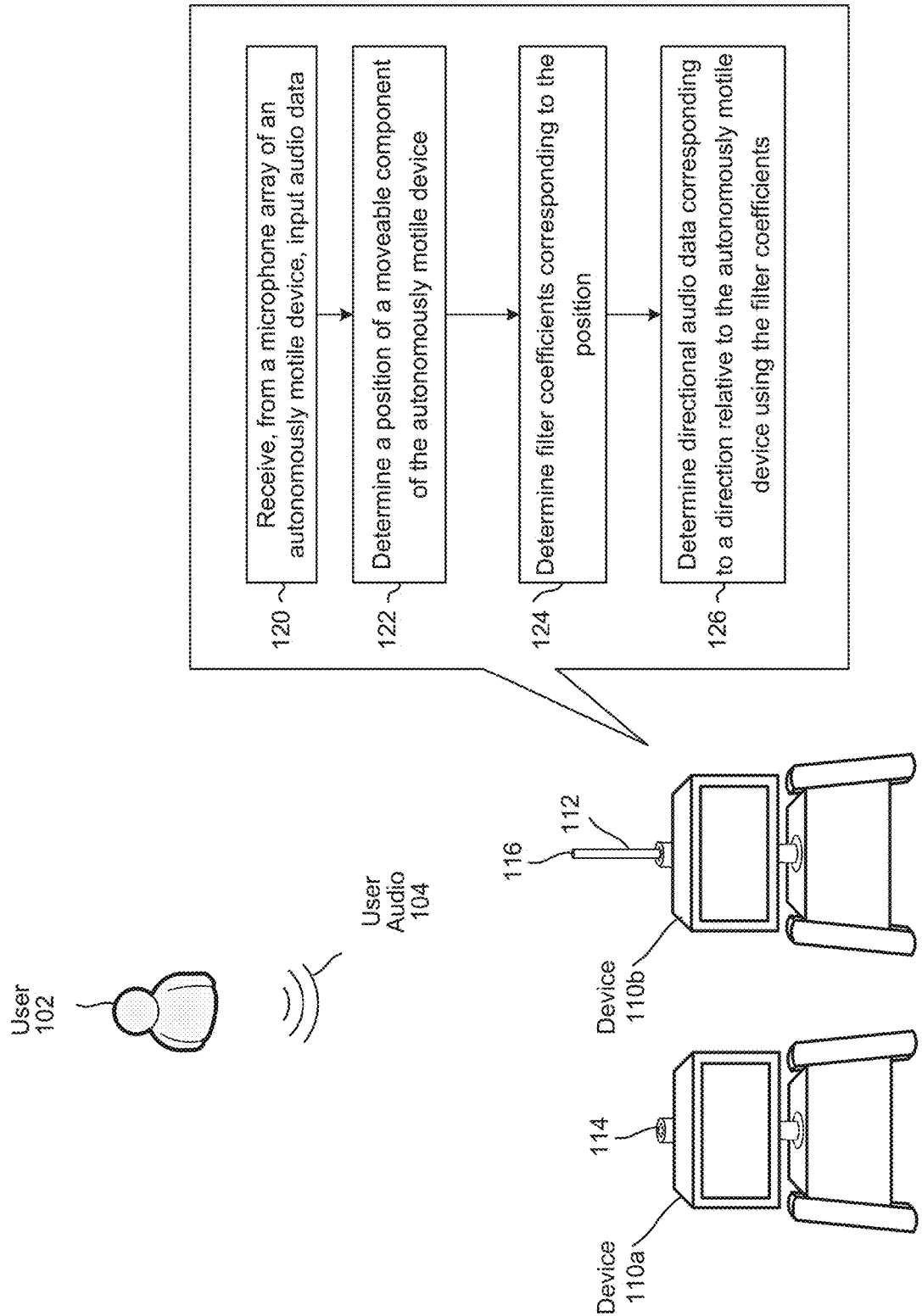
FIG. 1 illustrates a system and method for beamforming using a device capable of moving a component according to embodiments of the present disclosure.

An autonomously motile device—e.g., a robot—may include a speech-recognition system. Speech-recognition systems have progressed to a point at which humans may interact with the devices using speech. Such systems employ techniques to identify the words spoken by a human user based on the various qualities of a received audio input. Speech recognition combined with natural-language understanding processing techniques enable speech-based user control of a computing device to perform tasks based on the user's spoken commands. The combination of speech recognition and natural-language understanding processing techniques is commonly referred to as speech processing. Speech processing may also convert a user's speech into text data which may then be provided to various text-based software applications. Speech processing may be used by autonomously motile devices, computers, hand-held devices, telephone computer systems, smart loudspeakers, kiosks, and a wide variety of other devices to improve human-computer interactions. As described herein, an autonomously motile device may include a device that is capable of moving in an environment with or without a direct user command to do so. For example, an autonomously motile device may include wheels mounted on a housing that are driven by a motor; the device may further include sensors for sensing the environment and input/output devices for communicating with a user. The device may use its wheels, motor, sensors, and input/output devices to, for example, follow a user of the device throughout the environment.

Certain devices capable of capturing speech for speech processing may operate using a microphone array comprising multiple microphones, in which beamforming techniques operate on the audio captured by the microphone array. In audio systems, beamforming refers to techniques that are used to isolate audio from one or more particular directions. Beamforming may be particularly useful when filtering out noise from non-desired directions to focus on a desired direction, such as a direction corresponding to a user uttering speech. Beamforming may be used for various tasks, including isolating voice commands to be executed by a speech-processing system.

A fixed beamformer component may isolate audio from a particular direction or directions by applying one or more filters, each having different filter coefficients, to exploit variations in the time each microphone in the array receives audio from each direction. For example, the filter coefficients may determine that the beamformer applies a first time or phase delay to audio data from a first microphone and a second time or phase delay to audio data from a second microphone. Application of the first and second delays may cause audio from a desired direction to constructively interfere while audio from other directions destructively interferes, thereby amplifying audio from the desired direction while suppressing audio from other directions. The amount of the first and second delays may be determined based on the position of the microphones relative to each other. For example, if the microphones are closer to each other, the difference between the delays may be smaller, while if the microphones are farther from each other, the difference between the delays may be greater. The difference between the delays thus reflects the amount of time sound takes to travel between the microphones.

An adaptive beamformer may include an adaptive filter that removes noise using a reference signal by identifying a direction in which a noise source lies and removing the noise from desired audio. A beam selection component may be used to select at least one beam from a plurality of beams corresponding to a desired direction, such as a direction toward which a user is disposed.

Acoustic-echo cancellation refers to techniques that reduce or eliminate audio output by a loudspeaker of the autonomously motile device from audio received by a microphone of the autonomously motile device. Without acoustic-echo cancellation, any sound output by the loudspeaker would be re-captured by the microphone, and the resultant audio data would not just include sounds, such as utterances of a user, local to the device (e.g., "near-end" sounds), but also sounds, such as music or speech, sent to and output by the device ("far-end" sounds).

Performing beamforming using an autonomously motile device may, however, present challenges. The autonomously motile device may include one or more moveable components that are capable of motion and/or changing shape relative to the device. As discussed further below, these moveable components may include an extendable "mast";

one end of the mast may include a camera, and the device may extend or retract the mast to permit the camera to capture different views of the environment of the device. For example, the device may fully extend the mast (such that, for example, it positions the camera approximately half a meter above the device) to capture a panoramic image of the environment. Another moveable component may be a video screen; the autonomously motile device may pan, tilt, or otherwise move the screen to, e.g., track a desired user as the user and/or device moves and/or to perform an expression associated with a command or task.

As the moveable components of the autonomously motile device move, however, an acoustic channel between microphones of the autonomously motile device and one or more loudspeakers of the autonomously motile device may change as it is affected by one or more positions of the one or more moveable components. A mast housing, for example, may be disposed in a center of a microphone array; as the mast extends, the acoustic channel between the microphone array and a loudspeaker may change. The extended mast, may, for example, be disposed between one or more microphones of the microphone array and the loudspeaker, causing those microphones to receive a version of the sound output by the loudspeaker that is attenuated as compared to sound output by the loudspeaker when the mast is not extended. Microphones of the microphone array that are disposed between the extended mast and the loudspeaker may receive sound reflected from the mast that they do not receive when the mast is not extended. These differences in the audio channel when the mast is extended versus when it is not extended may cause beamforming performed by the autonomously motile device using the microphone array to perform less well than optimally or less well than predicted.

Embodiments of the present disclosure thus describe determining a position of a moveable component of an autonomously motile device, such as a mast or display screen. Based on this position, a set of corresponding filter coefficients are determined. The filter coefficients may have been determined to perform beamforming to take into account the position of the component and its associated effect on audio received by the microphone array, such as attenuation or reflections. The autonomously motile device may then perform beamforming using the filter coefficients. The autonomously motile device thus eliminates or reduces the deleterious effects of movement of a moveable component of the device on the microphone array and beamforming.

FIG. 1 illustrates a system that includes an autonomously motile device 110, which is described in greater detail below. In various embodiments, the autonomously motile device 110 may include a component disposed in a first position, such as that of a first configuration of the device 110a, and a component disposed in a second position, such as that of a second a configuration the device 110b. The component may be, but is not limited to, a mast 112. The autonomously motile device 110 may further be capable of autonomous motion using one or motors powering one or more wheels, treads, robotic limbs, or similar actuators, but the present disclosure is not limited to particular method of autonomous movement/motion. The device 110 may, for example, follow a user 102 around a room to thereby allow the user 102 easier access to features of the device 110, such as its voice interface.

The device 110 may further include one or more display screens for displaying information to a user 102 and/or receiving touch input from a user. The device 110 may further include a microphone array 114 including one or more microphones and one or more loudspeakers; the microphone array 114 may be used to receive audio data, such as an utterance represented by user audio 104, from the user 102. The utterance may be, for example, a command or request. The loudspeaker of device 110 may be used to output audio to the user 102, such as audio related to a response to command or audio related to response to a request.

The device 110 may further include one or more sensors; these sensors may include, but are not limited to, an accelerometer, a gyroscope, a magnetic field sensor, an orientation sensor, a weight sensor, a temperature sensor, and/or a location sensor (e.g., a global-positioning system (GPS) sensor or a Wi-Fi round-trip time sensor). The device may further include a computer memory, a computer processor, and one or more network interfaces. The device 110 may be, in some embodiments, a robotic assistant or "robot" that may move about a room or rooms to provide a user with requested information or services. In other embodiments, the device 110 is capable of rotation but not linear motion; the device 110 may be mounted or placed on a surface or floor, for example, and may rotate in place to face a user 102. The disclosure is not, however, limited to only these devices or components, and the device 110 may include additional components without departing from the disclosure.

In various embodiments, with reference to FIG. 1, the autonomously motile device 110 receives (120), from a microphone array of the autonomously motile device, input audio data. The device 110 determines (122) a position of a moveable component of the autonomously motile device 110. The device 110 determines (124) filter coefficients corresponding to the position. The device 110 determines (126) directional audio data (e.g., beamforming data) corresponding to a direction relative to the device 110 using the filter coefficients.

Figure 2B:
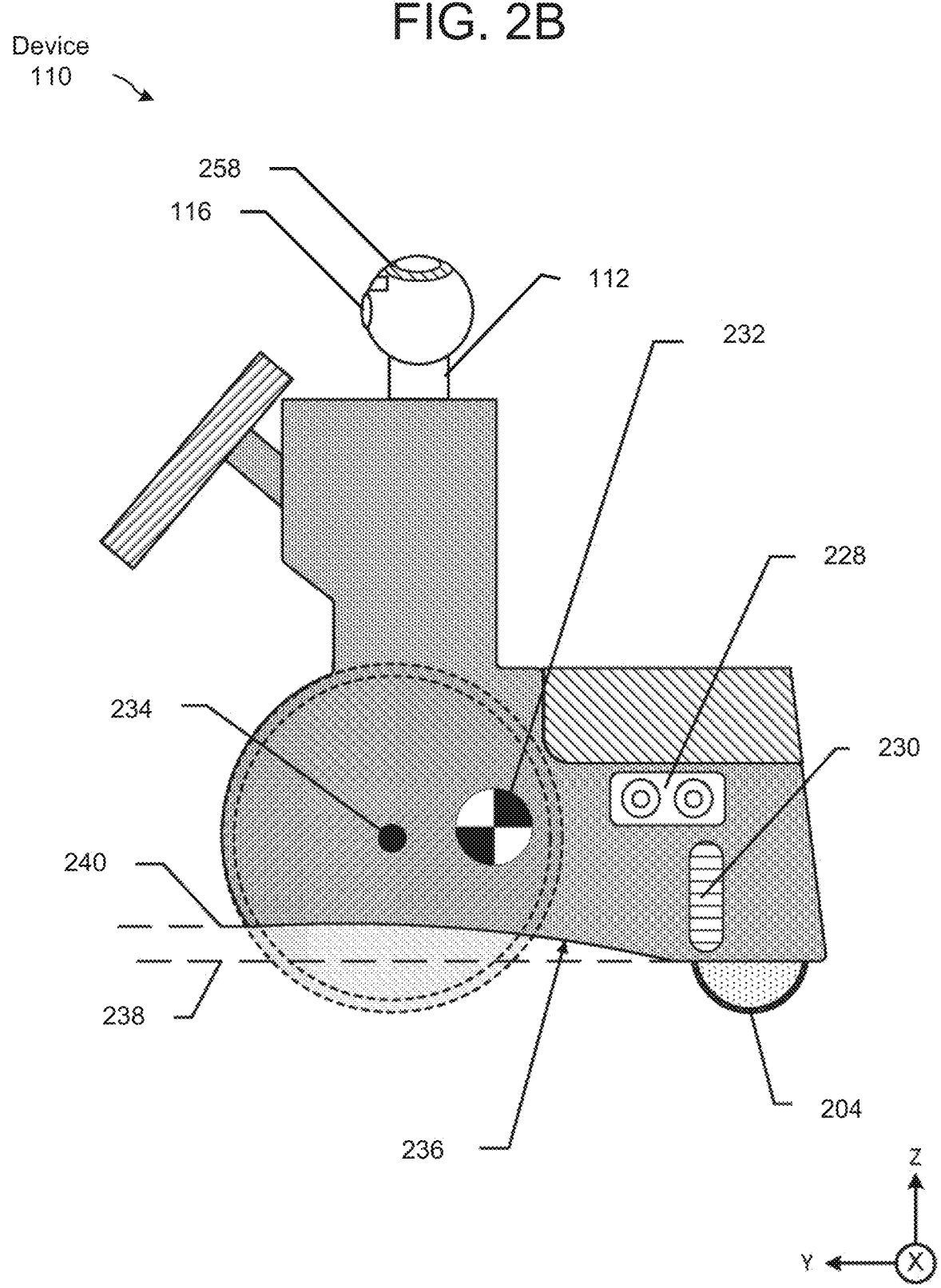

FIGS. 2A-2C illustrate an autonomously motile device 110 according to various embodiments of the present disclosure. Referring first to FIG. 2A, the device 110 includes wheels 202 disposed on left and right sides of a lower structure. The wheels 202 may be canted inwards toward an upper structure. In other embodiments, however, the wheels 202 may be mounted vertically. A caster 204 (i.e., a smaller wheel) may disposed along a midline of the device 110. The front section of the device 110 may include a variety of external sensors. A first set of optical sensors 206 may be disposed along the lower portion of the front, and a second set of optical sensors 208 may be disposed along an upper portion of the front. A microphone array 114 may be disposed on a top surface of the device 110; the microphone array 114 may, however, be disposed on any surface of the device 110.

One or more cameras 212 may be mounted to the front of the device 110; two cameras 212 may be used to provide for stereo vision. The distance between two cameras 212 may be, for example, 5-15 centimeters; in some embodiments, the distance is 10 centimeters. In some embodiments, the cameras 212 may exhibit a relatively wide horizontal field-of-view. For example, the horizontal field-of-view may be between 90° and 110°. A relatively wide field-of-view may provide for easier detection of moving objects, such as users or pets, which may be in the path of the device 110. Also, the relatively wide field-of-view may provide for the device 110 to more easily detect objects when rotating or turning.

Cameras 212 used for navigation may be of different resolution from, or sensitive to different wavelengths than, other cameras 116 used for other purposes, such as video communication. For example, navigation cameras 212 may be sensitive to infrared light allowing the device 110 to operate in darkness or semi-darkness, while a camera 116 mounted on a mast 112 may be sensitive to visible light and may be used to generate images suitable for viewing by a person. A navigation camera 212 may have a resolution of at least 300 kilopixels each, while the camera 116 mounted on the mast 112 may have a resolution of at least 10 megapixels. In some implementations, navigation may utilize a single camera 212.

The cameras 212 may operate to provide stereo images of the environment, the user, or other objects. For example, an image from the cameras 212 may be accessed and used to generate stereo-image data corresponding to a face of a user. This stereo-image data may then be used for facial recognition, user identification, gesture recognition, gaze tracking, and other uses.

The display 214 may be mounted on a movable mount. The movable mount may allow the display to move along one or more degrees of freedom. For example, the display 214 may tilt, pan, change elevation, and/or rotate. In some embodiments, the display 214 may be approximately 8 inches as measured diagonally from one corner to another. An ultrasonic sensor 218 may be mounted on the front of the device 110 and may be used to provide sensor data that represents objects in front of the device 110.

One or more loudspeakers 220 may be mounted on the device 110, and the loudspeakers 220 may have different audio properties. For example, low-range, mid-range, and/or high-range loudspeakers 220 may be mounted on the front of the device 110. The loudspeakers 220 may be used to provide audible output such as alerts, music, human speech such as during a communication session with another user, and so forth.

Other output devices 222, such as one or more lights, may be disposed on an exterior of the device 110. For example, a running light may be arranged on a front of the device 110. The running light may provide light for operation of one or more of the cameras, a visible indicator to the user that the device 110 is in operation, or other such uses.

One or more floor optical-motion sensors 224, 226 may be disposed on the front and/or underside of the device 110. The floor optical-motion sensors 224, 226 may provide indication indicative of motion of the device 110 relative to the floor or other surface underneath the device 110. In some embodiments, the floor optical-motion sensors 224, 226 comprise a light source, such as light-emitting diode (LED) and/or an array of photodiodes. In some implementations, the floor optical-motion sensors 224, 226 may utilize an optoelectronic sensor, such as an array of photodiodes. Several techniques may be used to determine changes in the data obtained by the photodiodes and translate this into data indicative of a direction of movement, velocity, acceleration, and so forth. In some implementations, the floor optical-motion sensors 224, 226 may provide other information, such as data indicative of a pattern present on the floor, composition of the floor, color of the floor, and so forth. For example, the floor optical-motion sensors 224, 226 may utilize an optoelectronic sensor that may detect different colors or shades of gray, and this data may be used to generate floor characterization data.

FIG. 2B illustrates a side view of the device 110 according to various embodiments of the present disclosure. In this side view, the left side of the device 110 is illustrated; the right side may include similar features. The mast 112 is extended to a first position; a camera 116 is disposed at an upper end of the mast 112. An ultrasonic sensor 228 and an optical sensor 230 may be disposed on either side of the device 110.

The disposition of components of the device 110 may be arranged such that a center of gravity 232 is located between a wheel axle 234 of the front wheels 202 and the caster 204. Such placement of the center of gravity 232 may result in improved stability of the device 110 and may also facilitate lifting by a carrying handle.

In this illustration, the caster 110 is shown in a trailing configuration, in which the caster 110 is located behind or aft of the wheel axle 234 and the center of gravity 232. In another implementation (not shown) the caster 110 may be in front of the axle of the wheels 202. For example, the caster 204 may be a leading caster 204 positioned forward of the center of gravity 232.

The device 110 may encounter a variety of different floor surfaces and transitions between different floor surfaces during the course of its operation. A contoured underbody 236 may transition from a first height 238 at the front of the device 110 to a second height 240 that is proximate to the caster 204. This curvature may provide a ramp effect such that, if the device 110 encounters an obstacle that is below the first height 238, the contoured underbody 236 helps direct the device 110 over the obstacle without lifting the driving wheels 202 from the floor.

FIG. 2C illustrates a rear view of the device 110 according to various embodiments of the present disclosure. In this view, as with the front view, a first pair of optical sensors 242 may be located along the lower edge of the rear of the device 110, while a second pair of optical sensors 244 are located along an upper portion of the rear of the device 110. An ultrasonic sensor 246 may provide proximity detection for objects that are behind the device 110.

Charging contacts 248 may be provided on the rear of the device 110. The charging contacts 248 may include electrically conductive components that may be used to provide power (to, e.g., charge a battery) from an external source such as a docking station to the device 110. In other implementations, wireless charging may be utilized. For example, wireless inductive or wireless capacitive charging techniques may be used to provide electrical power to the device 110.

In some embodiments, the wheels 202 may include an electrically conductive portion 250 and provide an electrical conductive pathway between the device 110 and a charging source disposed on the floor. One or more data contacts 252 may be arranged along the back of the device 110. The data contacts 252 may be configured to establish contact with corresponding base data contacts within the docking station. The data contacts 252 may provide optical, electrical, or other connections suitable for the transfer of data.

Other output devices 260, such as one or more lights, may be disposed on an exterior of the back of the device 110. For example, a brake light may be arranged on the back surface of the device 110 to provide users an indication that the device 110 is slowing or stopping.

The device 110 may include a modular payload bay 254. In some embodiments, the modular payload bay 254 is located within a lower structure of the device 110. The modular payload bay 254 may provide mechanical and/or electrical connectivity with the device 110. For example, the modular payload bay 254 may include one or more engagement features such as slots, cams, ridges, magnets, bolts, and so forth that are used to mechanically secure an accessory within the modular payload bay 254. In some embodiments, the modular payload bay 254 includes walls within which the accessory may sit. In other embodiments, the modular payload bay 254 may include other mechanical engagement features such as slots into which the accessory may be slid and engage. The device 110 may further include a mast 112, which may include a camera 116 and a light 258.

FIG. 3A illustrates further details of the microphone array 114. In some embodiments, the microphone array 114 includes eight microphones 302a, 302b, 302c, 302d, 302e, 302f, 302g, and 302h, arranged in two concentric circles; the four microphones of one circle are rotated 45 degrees with respect to the four microphones of the other circle. The present disclosure is not, however limited to any particular number or arrangement of microphones. In particular, the autonomously motile device may feature only a single microphone. The microphones 302 may be disposed around a mast housing 304 from which a mast 112 may extend, as explained in greater detail below.

As described above, the microphone array 114 may include a number of different individual microphones. The individual microphones may capture sound and pass the resulting audio signals created by the sound to downstream components, as discussed below. Each individual piece of audio data captured by a microphone may be in the time domain; these signals may be converted to the frequency domain using an analysis filterbank, as described below.

Figure 3B:
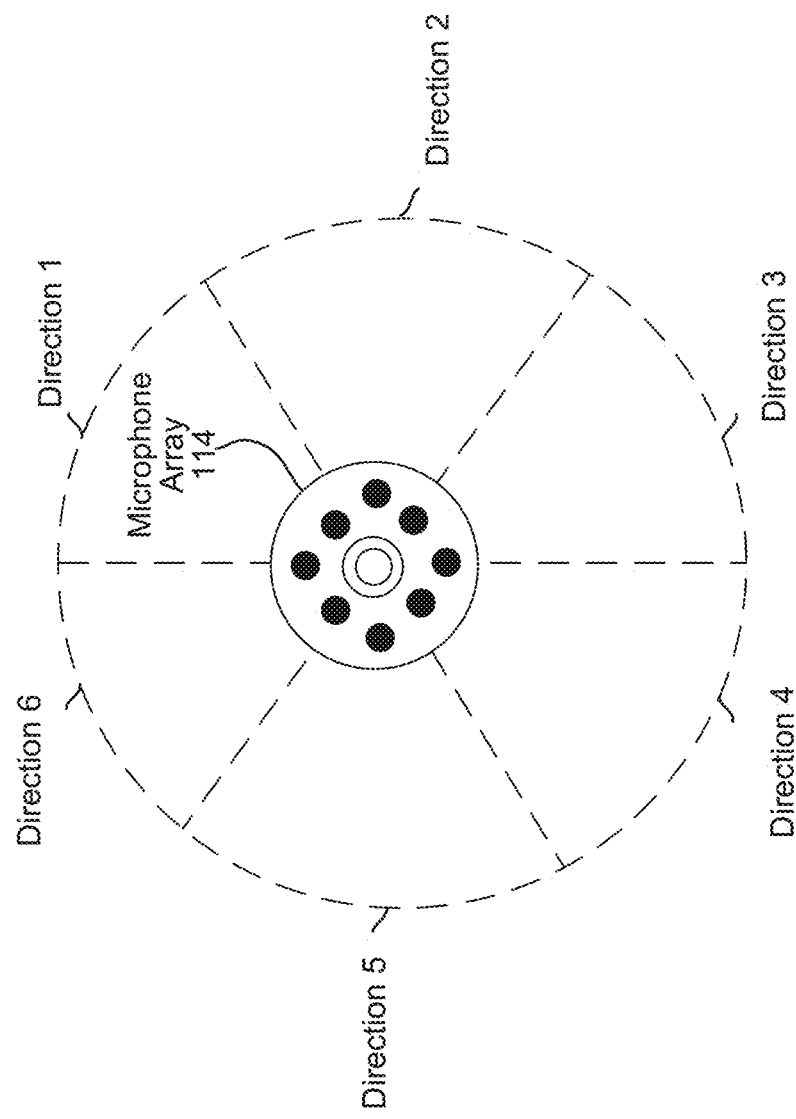
Figure 3C:
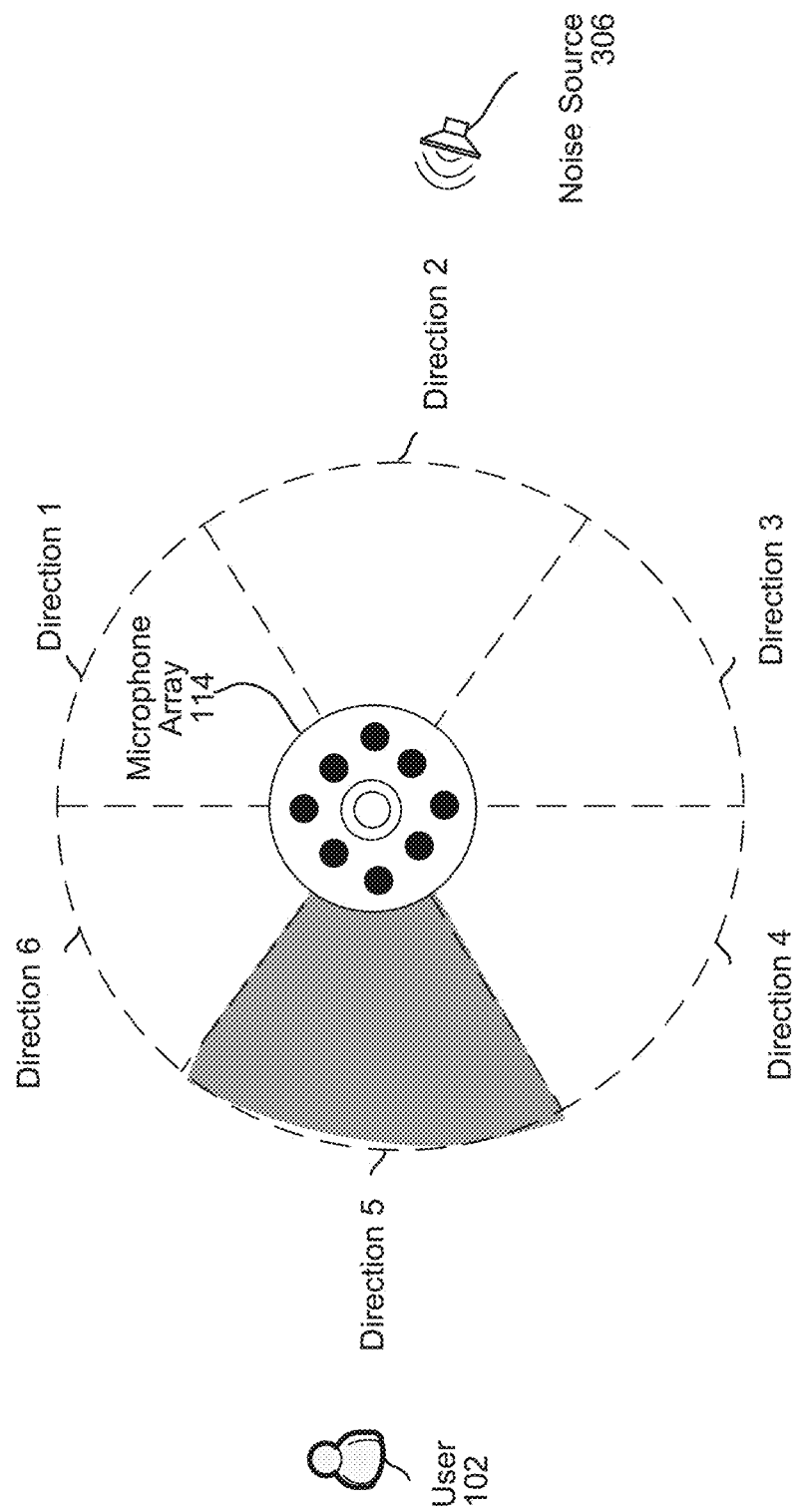

FIG. 3B illustrates that the device 110, using the beamforming techniques described herein, may use data from the microphones to determine directional audio data corresponding to audio originating from one of six directions 1-6 relative to the device 110. The device 110 may, however, determine directional audio data for any number of directions relative to the device 110 without deviating from the present disclosure. The number of directions may be the same as the number of microphones 302 or may be different from the number of microphones 302. In one example, with reference to FIG. 3C, a user 102 is disposed in a first direction 5 relative to the device 110, while a noise source 306 is disposed in a second direction 2 relative to the device 110. As described herein, the autonomously motile device 110 may amplify audio originating in the first direction 5 and suppress audio originating in the second direction 2.

To isolate audio from a particular direction, as discussed herein, the device 110 may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device 110 may determine that the source of the audio that resulted in the segment of audio data may be located closer to the first microphone than to the second microphone (which resulted in the audio being detected by the first microphone before being detected by the second microphone).

Figure 4A:
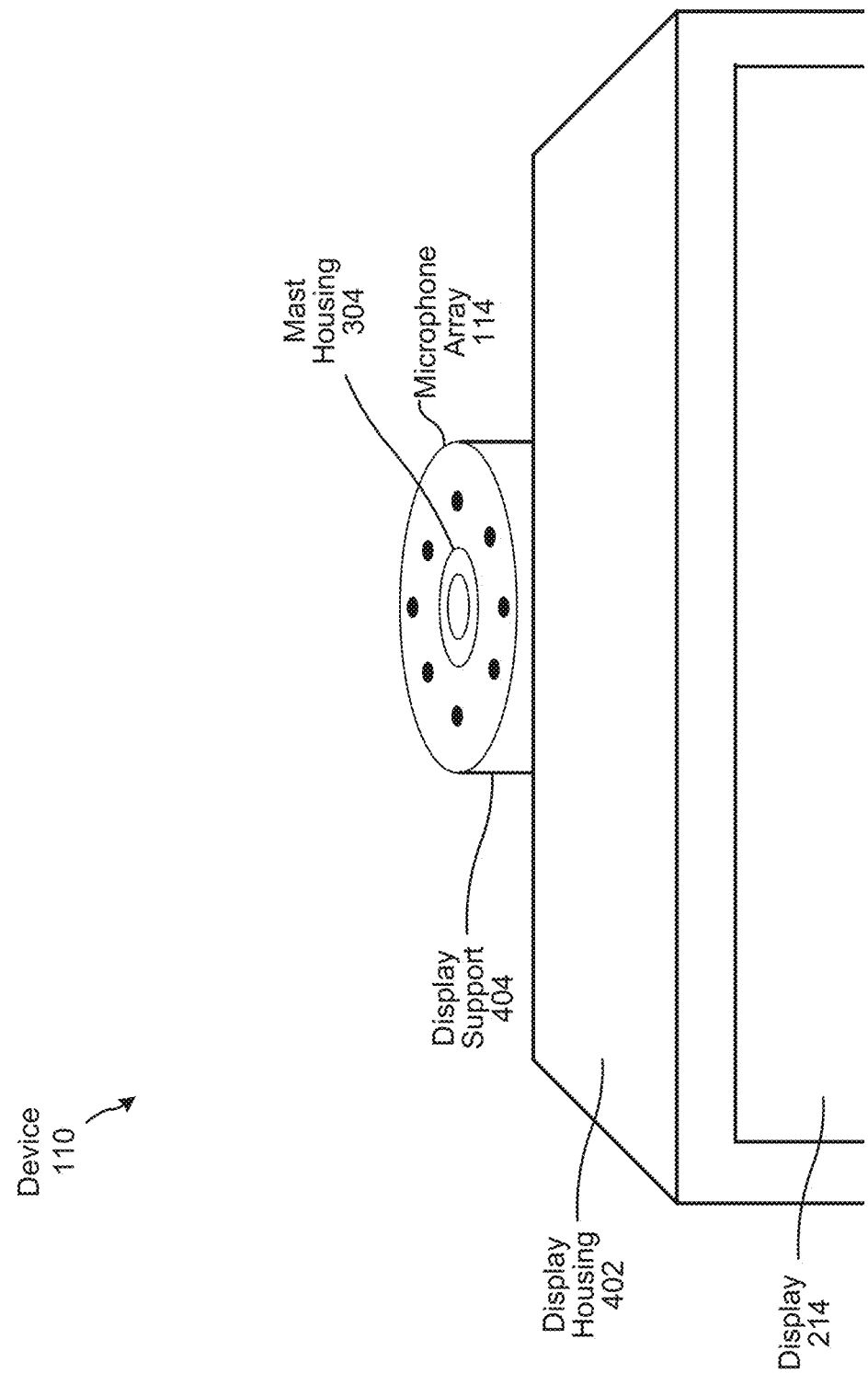

FIGS. 4A-4D illustrate an autonomously motile device 110 capable of changing a position of a moveable component. In these figures, the moveable component is a mast 112 having a camera 116 disposed thereon. Referring first to FIG. 4A, the mast 112 and camera 116 may be hidden behind a mast housing 304, which may be flush with a top surface of a display support 404. The display support 404 may be in mechanical contact with a display housing 402; this mechanical contact may include a hinging mechanism that allows the display housing to pan, tilt, or rotate with respect to the device 110. The display housing 402 may house the display 214.

Figure 4C:
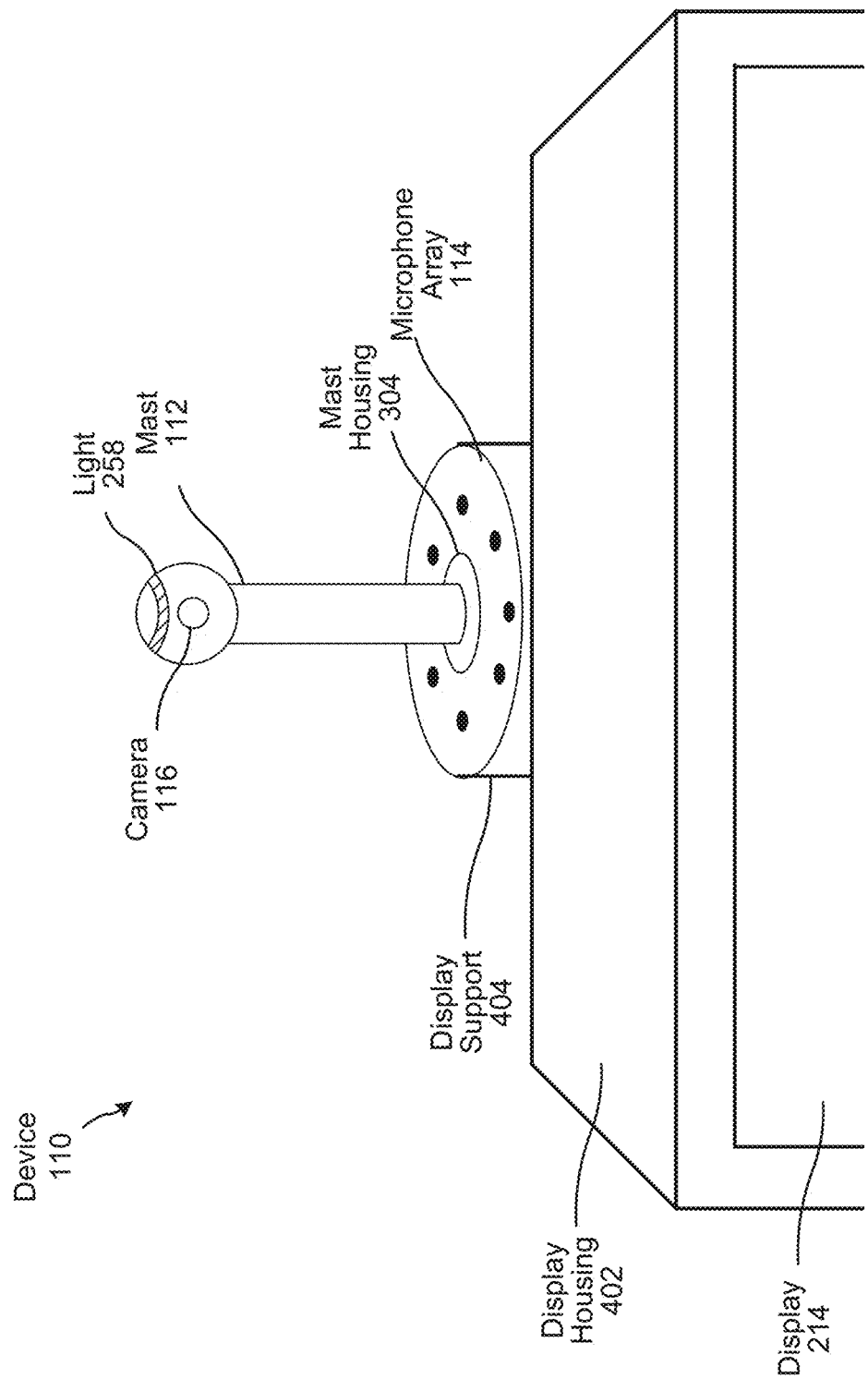

FIGS. 4B, 4C, and 4D illustrate that the mast 112 may be disposed in different positions relative to the autonomously motile device 110. The positions may be a set of discrete positions or may be a spectrum of positions between a minimum height and a maximum height. Referring first to FIG. 4B, the autonomously motile device 110 may cause the mast 112 to extend from the mast housing 304 to a first position. In this first position, the camera 116 may be disposed at a first height above the mast housing 304; this first height may be, for example, 20 centimeters above the mast housing 304. The autonomously motile device 110 may cause the mast 112 to move using an electrically controllable motor, such as a stepper motor. The autonomously motile device 110 may determine that the mast 112 is in the first position based on a length of time of operation of the motor (or other such actuator), by receiving feedback from a sensor, or both.

Referring to FIG. 4C, the autonomously motile device 110 may continue to extend the mast 112 until the camera 116 is in a second position relative to the mast housing 304. This second position may be, for example, 100 centimeters above the mast housing 304. The autonomously motile device 110 may similarly cause the mast 112 to move using an electrically controllable motor, and may similarly determine that the camera 116 is in the second position using the timer and/or sensor.

Referring to FIG. 4D, the autonomously motile device 110 may continue to extend the mast 112 until the camera 116 is in a third position relative to the mast housing 304. This third position may be, for example, 200 centimeters above the mast housing 304. The autonomously motile device 110 may similarly cause the mast 112 to move using an electrically controllable motor, and may similarly determine that the camera 116 is in the third position using the timer and/or sensor. In this example, the mast 112 may have two components: a first component mast A 112a having a diameter similar to that of the mast 112 described above with reference to FIGS. 4B and 4C, and a second component mast B 112b having a diameter greater than that of the mast 112 described above with reference to FIGS. 4B and 4C. The mast 112 may include additional components of even greater diameter to permit the mast 112 to extend still further.

Figure 5B:
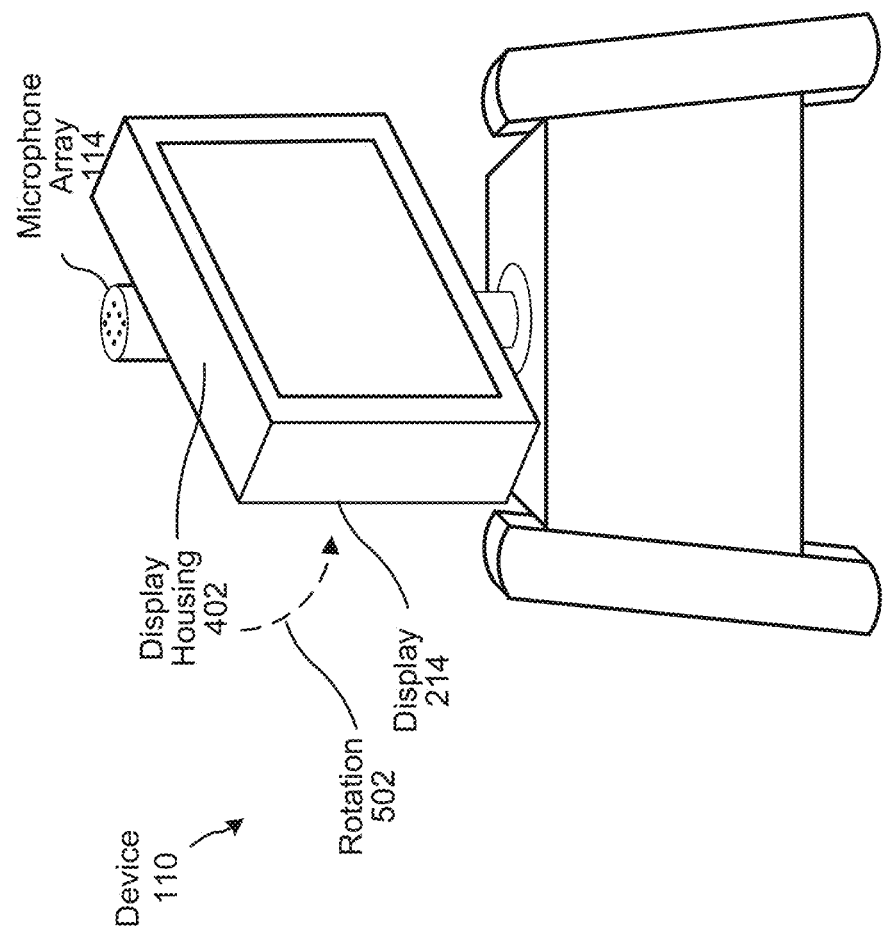

FIGS. 5A-5C illustrate an autonomously motile device 110 capable of changing a physical position of another moveable component. In these embodiments, the moveable component is the display housing 402, as shown in FIG. 5A. As shown in FIG. 5B, the device 110 may cause a rotation 502 of the display housing 402; the rotation 502 may occur in either of two directions (e.g., clockwise or counterclockwise). The device 110 may cause the rotation using a motor such as a stepper motor or other actuator and may determine an amount of rotation based on a duration of the rotation and/or a sensor. Referring to FIG. 5C, the device 110 may further cause a tilt 504 of the display housing 402, which may be similarly be performed using an actuator and may be measured using a timer and/or sensor.

The autonomously motile device 110 may include other moveable components that are capable of changing their position in response to commands from the device 110. These devices may include but are not limited to a robotic arm or similar manipulator; an umbrella or similar retractable rain shield; a launching device for launching items such as balls or dog treats; a second mast that supports a microphone, light, or other device; one or more retractable panels for covering a sensor for protection or for opening to reveal a storage area; or other such moveable components.

As described herein, a beamformer may determine directional data by filtering audio data received by at least two microphones based on the relative position and distance of the two microphones. The relative position and distance are reflected in a set of filter coefficients used to process the audio data. For example, the filter coefficients may cause a filter, such as a finite-impulse-response (FIR) filter, to change the magnitude and/or phase of audio data from the first microphone by first amounts and to change the magnitude and/or phase of audio data from the second microphone by second amounts. The filter coefficients may thus cause audio from a desired direction to be amplified (e.g., constructively interfere) and audio from other directions to be attenuated (e.g., destructively interfere).

The filter coefficients may be determined mathematically based on the physical relationship (e.g., position and distance) between the microphones in a microphone array using, e.g., theoretically estimated array manifold vectors which assume freefield conditions. These estimated filter coefficients may not, however, take movement of a moveable component of the device 110, such as the mast 112, into account. Movement of the moveable component may thus adversely affect the beamforming performance of the device 110, meaning that the device 110 will have a reduced ability to isolate sound from a particular direction.

In various embodiments of the present disclosure, the filter coefficients may be determined using a total field measurement for each position of the moveable component or components. The total field measurement may be performing using a software tool, such as COMSOL. A total field measurement refers to processing a 3D virtual representation of the device 110 with simulated audio from a plurality of source locations. The 3D virtual representation of the device 110 may be a collection of virtual shapes, surfaces, edges, vertices, etc., that collectively form a virtual representation of the device 110. Each shape may be defined using one or more coordinates in a coordinate system; an edge, for example, may be defined by its two (x,y,z) endpoints. The 3D virtual representation may further include a virtual representation of the microphone array 114. For each source location of audio and for each of a set of frequencies of the audio, the time of arrival of the audio and the amplitude of the audio as recorded by the virtual representation of each of the plurality of microphones of the 3D virtual representation is determined via simulation—this data may be referred to as a steering vector. The source location may vary in a horizontal plane around the device 110 (e.g., a polar angle) and/or a vertical plane around the device 110 (e.g., an azimuth angle).

The filter coefficients for each position of the moveable component may thus be determined to reflect the measured times and amplitudes. The simulated audio from each source may be modeled as a planar wave, and the filter coefficients may thus be determined using a finite element analysis. The simulated audio from each source may instead be modeled as a spherical wave, and the filter coefficients may thus be determined using a boundary element analysis. Any method of determining the filter coefficients is, however, within the scope of the present disclosure.

In some embodiments, the simulated data collected by the microphones (e.g., the steering vectors) may be normalized to a particular steering vector, meaning they may be expressed as a percentage difference with respect to the chosen steering vector. For example, if a value of the chosen steering vector is set to 1.0, corresponding values of other steering vectors may be expressed as how far they differ from the original value (e.g., 0.8 for a value of another steering vector that is 80% the size of the value of the chosen steering vector, 1.2 for a value of another steering vector that is 120% the size of the value of the chosen steering vector, etc.). The steering vector selected for normalization may have a frequency at which beamforming performance using filter coefficients determined by a freefield (e.g., estimated) process begin to diverge from beamforming performing using filter coefficients determined by a total field (e.g., measured) process. A particular source of audio data may be selected to have a particular location, such as 0 degrees azimuth and 90 degrees polar. The selected frequency may be between 180 and 200 Hz; in some embodiments, the selected frequency is 190 Hz. The normalization factor may be determined by taking the average of the absolute values of the steering vector for this frequency and position. The normalization factor corresponds to a value required to change the average of the absolute values of the steering vector for the frequency and position (via multiplication or division) to a normalized value, such as 1.0; this same value may then be used to multiply or divide values of the other steering vectors. In some embodiments, the filter coefficients are further modified to apply a phase shift to data processed by the filter. This phase shift may be, for example, 128 samples or 174 samples.

Figure 6:
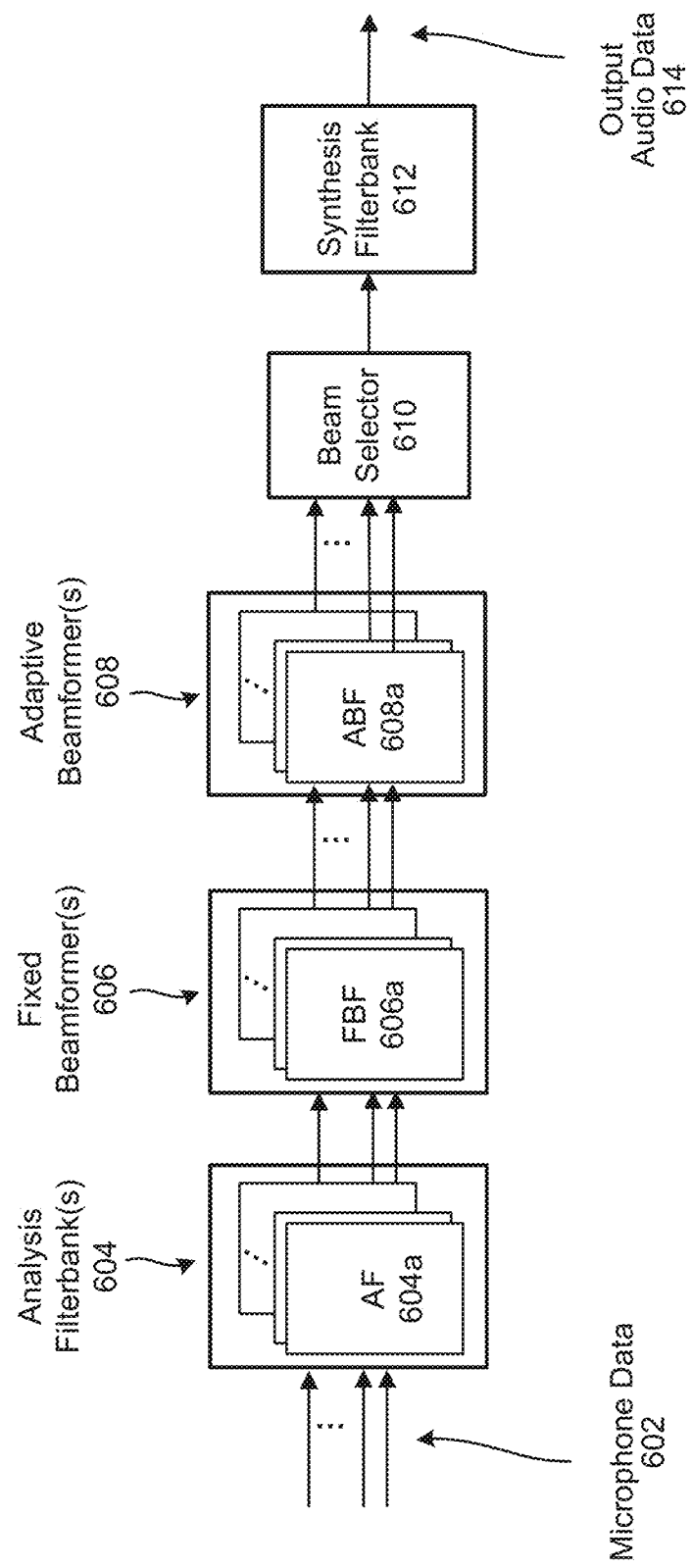
FIG. 6 illustrates a system for processing audio including performing beamforming according to embodiments of the present disclosure.

FIG. 6 illustrates a system for audio processing that includes beamforming. For clarity, single instances of each component of the system may be illustrated; one of skill in the art will understand, however, that the system may include multiple instances of each component in accordance with each microphone 302 of the microphone array 114, each frequency bin, and/or each reference signal. In some embodiments, the system includes eight microphones and 128 frequency bins. An overview of the system is first presented in the below paragraphs; each component is then described in greater detail.

In various embodiments, the microphone array 114 receives audio corresponding to the environment of the device 110 and transduces the audio into microphone data 602. An analysis filterbank 604 converts the audio data 602 into frequency-domain audio data and may further separate the frequency-domain audio data into two or more frequency ranges or "bins." A fixed beamformer 606 may determine directional data in accordance with sets of filter coefficients, as described herein. An adaptive beamformer 608 may adaptively process the audio data to remove reference data, which may be directional audio data in the direction of a source of noise. A beam selector 610 may select one of a plurality of beams, and a synthesis filterbank 612 may convert the selected beam data into output audio data 614. Each of these components is described in greater detail below.

The analysis filterbank 604 may perform a Fourier transform, such as a fast Fourier transform (FFT), and may include one or more uniform discrete Fourier transform (DFT) filterbanks, which convert the time-domain audio data 602 into the frequency-domain audio data. The frequency-domain audio data may include a plurality of audio signals Y in the sub-band domain. The audio signals Y may incorporate audio signals corresponding to multiple different microphones 302 as well as different sub-bands (i.e., frequency ranges) as well as different frame indices (i.e., time ranges). Thus, the audio data 602 from the mth microphone 302 may be represented as $X_m(k,n)$, where k denotes the sub-band index, and n denotes the frame index. The combination of all audio signals for all m microphones 302 for a particular sub-band index frame index may be represented as $X(k,n)$.

In various embodiments, the fixed beamformer 606 is a beamformer configured to determine directional audio data in accordance with filter coefficients. The fixed beamformer 606 boosts audio from a target direction while suppressing audio from other directions As described herein, beamforming (e.g., performing a direction-based separation of audio data) corresponds to generating a plurality of directional audio signals (e.g., beamformed audio data) corresponding to individual directions relative to the microphone array 114. A first beam may correspond to first beamformed audio data associated with a first direction (e.g., portions of the input audio signals corresponding to the first direction), a second beam may correspond to second beamformed audio data associated with a second direction (e.g., portions of the input audio signals corresponding to the second direction), and so on. As used herein, "beams" refer to the beamformed audio signals that are generated by the beamforming operation. Therefore, a first beam corresponds to first audio data associated with a first direction, whereas a first directional calculation corresponds to the first filter coefficient values used to generate the first beam.

For example, the beamforming operation may individually filter input audio signals generated by multiple microphones 302 in the microphone array 114 (e.g., first audio data associated with a first microphone, second audio data associated with a second microphone, etc.) in order to separate audio data associated with different directions. Thus, first beamformed audio data corresponds to audio data associated with a first direction, second beamformed audio data corresponds to audio data associated with a second direction, and so on.

To perform the beamforming operation, the fixed beamformer 606 may apply directional calculations to the input audio signals. In some examples, the fixed beamformer 606 may perform the directional calculations by applying filters to the input audio signals using filter coefficient values associated with specific directions. For example, the fixed beamformer 606 may perform a first directional calculation by applying first filter coefficient values to the input audio signals to generate the first beamformed audio data and may perform a second directional calculation by applying second filter coefficient values to the input audio signals to generate the second beamformed audio data.

In one example of a beamformer system, a fixed beamformer employs a filter-and-sum structure to boost an audio signal that originates from a desired direction (sometimes referred to as the look-direction) while largely attenuating audio signals that original from other directions. A fixed beamformer unit may effectively eliminate certain diffuse noise (e.g., undesirable audio), which is detectable in similar energies from various directions, but may be less effective in eliminating noise emanating from a single source in a particular non-desired direction. The beamformer may further include an adaptive beamformer that may adaptively cancel noise from different directions, depending on audio conditions.

Beamforming may be performed by determining filter coefficient values (e.g., Finite Impulse Response (FIR) filter coefficient values) for each beam direction (e.g., look direction, direction of interest, etc.) based on a position of physical microphones in the microphone array 114. For example, a first position of a first physical microphone may correspond to a first filter coefficient associated with a first direction and a second position of a second physical microphone may correspond to a second filter coefficient associated with the first direction. Thus, to generate beamformed audio data in the first direction, the beamformer may apply the first filter coefficient value to first audio data captured by the first physical microphone and apply the second filter coefficient value to second audio data captured by the second physical microphone.

The filter coefficient values may be determined using minimum variance distortionless response (MVDR) beamformer techniques, Linearly Constrained Minimum Variance (LCMV) beamformer techniques, and/or generalized eigenvalue (GEV) beamformer techniques, although the disclosure is not limited thereto and the filter coefficient values may be determined using any technique known to one of skill in the art without departing from the disclosure.

As described above, the filter coefficient values used to perform the beamforming operations may be calculated offline (e.g., preconfigured ahead of time) and stored in the device 110. In various embodiments, a computer model of the device 110 may be constructed using, for example, computer-aided design (CAD) software. The model may then be analyzed using a finite-element model (FEM) application; based on the FEM analysis, the acoustic properties of each microphone 302 may be determined for each incident angle. These properties may then be used to determine the values of the above-referenced matrices.

The system may include an adaptive beamformer 608. The adaptive beamformer 608 may process the audio data in accordance with a reference signal, such as a beam of the fixed beamformer 606, to adaptively amplify parts of the audio data similar to the reference signal while attenuating parts of the audio data dissimilar to the reference signal (e.g., audio from a direction associated with a source of noise).

A beam selector 610 receives beam data corresponding to two or more beams and, in accordance with the various techniques described herein, such as selecting a loudest beam, selects data corresponding to a selected beam. The beam selector 610 may select one or more of the beams as output beams. For example, the beam selector 610 may determine one or more signal quality values (e.g., loudness, SNR, power value, signal-to-noise plus interference ratio (SINR), and/or other signal quality metrics known to one of skill in the art) associated with each of the adapted beam data and may select the adapted beam data having the highest signal quality metric as the selected beam. In various embodiments, the beam selector 610 is capable of selecting a new beam every 100-200 milliseconds.

A synthesis filterbank 608 may be used to convert the frequency-domain data back to time-domain output audio data 614 using, for example, an inverse Fourier transform (such as an Inverse Fast Fourier Transform (IFFT). The output audio data 614 may then be used for further audio processing, such as speech processing.

In various embodiments, an acoustic-echo cancellation component may be used to remove reference audio data from the frequency-domain audio data; this reference audio data may be received from an audio data source, such as a far-end participant on a voice or video call. The acoustic-echo cancellation component may subtract reference audio data from the frequency-domain audio data using, for example, hardware and/or software configured to subtract data representing a first signal from data representing a second signal. The acoustic-echo cancellation component may include an adaptive filter, such as a finite impulse-response (FIR) filter, that is configured to minimize an error signal between an output of the filter and the near-end audio. Multiple acoustic echo cancellers may be used for each microphone 302 and/or for each frequency bin. Multiple acoustic echo cancellers may further be used for multiple reference signals, such as left-and-right stereo reference signals.

The acoustic echo canceller may, as described above, determine an estimate of the channel for each of a plurality of reference signals and frequency bins. The acoustic echo canceller may determine these estimates over time for each of a plurality of audio samples. In some embodiments, each sample corresponds to a frame of audio data, which may be 10 milliseconds in size. In other embodiments, a frame of audio data includes a plurality of audio samples.

In various embodiments, like the filter coefficients used for beamforming described herein, similar filter coefficients may be determined for acoustic echo cancellation. The adaptive filter of the acoustic echo cancellation component may estimate the acoustic channel between the microphone array 116 and the loudspeaker 220; this acoustic channel may include the moveable component of the device 110. The adaptive filter may thus process reference audio data—which may also be output by the loudspeaker 220 to create output audio—to create estimated audio data that estimates the reference audio data as received by the microphone array 116. When the moveable component moves from a first position to the second position, the acoustic echo cancellation component may use the predetermined filer coefficients in a first iteration of adapting the adaptive filter to reflect the movement. The acoustic echo cancellation component may, however, use the predetermined filter coefficients only when the effects of moving the moveable component have a greater effect on the acoustic channel than do other effects, such as reflections from the environment. If the environment is very reflective, for example, movement of the moveable component may have a negligible effect on the overall estimation of the acoustic channel. The acoustic echo cancellation component may thus first determine if a difference between the predetermined filer coefficients and a current set of filter coefficients of the adaptive filter is greater than a threshold and use the predetermined filter coefficients only when the difference is less than the threshold.

Figure 7:
FIG. 7 illustrates a system for selecting filter coefficients for beamforming when a component of a device has moved according to embodiments of the present disclosure.

FIG. 7 illustrates a system for selecting filter coefficients for beamforming when a moveable component of a device has moved according to embodiments of the present disclosure. In various embodiments, a device component position determination component 704 receives device component position data 702 and determines a position of one or more components of the autonomously motile device 110. The device component position data 702 may be a prior position of a component, an amount of time that an actuator has moved the moveable component since the time it was in the prior position, and a velocity at which the actuator moves the component. The device component position determination component 704 may then determine a new position of the moveable component by adding the product of the time and the velocity to the prior position. The device component position data 702 may instead or in addition be sensor data that represents a position of the component; the sensor may be, for example, a light or infrared sensor in which an amount of light received by the sensor varies based on the position of the component. The device component position determination component 704 may, in this example, map the amount of light captured by the sensor to the position of the moveable component using, for example, a look-up table of predetermined amount of light-to-position ratios.

The device component position determination component 704 may output a device component position determination 706. The device component position determination 706 may be a linear value (e.g., millimeters) that the moveable component has moved from a reference position. If the moveable component is the mast 112, for example, the device component position determination 706 may be a number of millimeters that the mast 112 has extended past the mast housing 304. The device component position determination 706 may instead or in addition be an integer representing one of a number of predetermined discrete positions of the mast 112. For example, a first position of the mast (as shown in FIG. 4B) may correspond to a position "one," a second position of the mast 112 (as shown in FIG. 4C) may correspond to a position "two," and so on. If a position of the mast 112 lies between two predetermined positions, the device component position determination 706 may be a decimal value lying between the two positions, such as "1.5" for a position halfway between the first position and the second position.

The device component position determination 706 may instead or in addition include polar and/or azimuth coordinates describing a rotation and tilt of the component, such as the display housing 402. In these embodiments, the device component position determination 706 may instead or in addition be integer and/or decimal values representing a preset number of rotation and/or azimuth values.

A filter coefficient selection component 708 may receive the device component position determination 706 and select one of a set of filter coefficients represented in filter coefficient data 710. If only one moveable component is capable of motion and/or only one component has a corresponding set of filter coefficients, the filter coefficient selection component 708 may select filter coefficients corresponding to the device component position determination 706. The filter coefficient data 710 may, for example, associate each set of filter coefficients for the component with a corresponding predetermined discrete position of the component. The filter coefficient selection component 708 may send an indication of the predetermined discrete position and component to the filter coefficient data 710, which may return the associated filter coefficients. If the device component position determination 706 indicates a position that lies between two predetermined discrete positions, the filter coefficient selection component 708 may select the predetermined discrete position that lies closes to the position represented by the device component position determination 706. In other embodiments, the filter coefficient selection component 708 may determine interpolated filter coefficients that correspond to the two sets of predetermined filter coefficients of the two predetermined discrete positions using, for example, a polynomial or basis function.

If two moveable components are capable of motion, the filter coefficient data 710 may include a two-dimensional matrix of filter coefficients. Each row of the matrix may correspond to a range of positions of the first component given that the second moveable component is motionless, while each column of the matrix may correspond to a range of positions of the second moveable component given that the first moveable component is motionless. A three-dimensional matrix may be used for three moveable components, a fourth-dimensional matrix may be used for four moveable components, and so on. In each embodiment, the filter coefficient selection component 708 may determine the indices of the matrix that correspond to the device component position determination 706 and send the indices to the filter coefficient data 710 to receive a corresponding set of filter coefficients. The filter coefficient selection component 708 may thus send selected coefficient data 712 representing the selected coefficients to the fixed beamformer 606, which may then use the filter coefficients to perform beamforming.

The fixed beamformer 606 may use a first set of selected filter coefficients to process audio data for a target beam and a second set of selected filter coefficients to process audio data for a reference beam.

In some embodiments, the fixed beamformer 606 may behave erratically or unpredictably when the filter coefficient selection component 708 directs it to switch from a first set of filter coefficients to a second set of filter coefficients. For example, if the fixed beamformer 606 is being used to generate a beam corresponding to a user speaking an utterance, during the switch of the coefficients, a glitch or other audio artifact may appear in audio data determined by the fixed beamformer 606. The filter coefficient selection component 708 may thus instruct the fixed beamformer 606 to attenuate and/or mute audio represented in its output beam(s) for a duration of time (e.g., 10-20 milliseconds) corresponding to duration of an audio artifact after using the new filter coefficients. After the duration of time elapses, the filter coefficient selection component 708 may instruct the fixed beamformer 606 to cease attenuation of its output beam(s).

Figure 8:
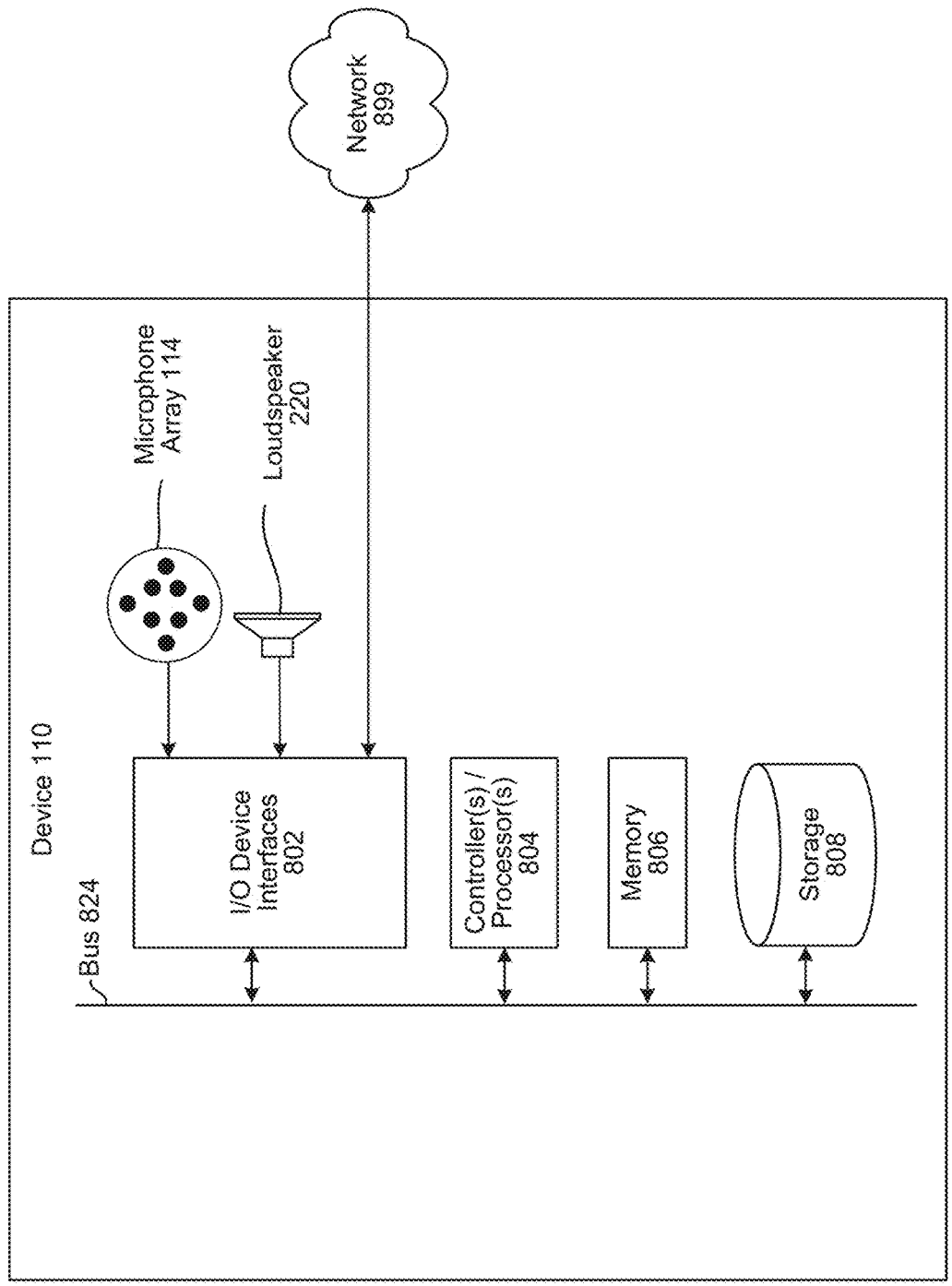
FIG. 8 illustrates a system for beamforming using a device capable of moving a component according to embodiments of the present disclosure.

FIG. 8 is a block diagram conceptually illustrating example components of the device 110. In operation, the device 110 may include computer-readable and computer-executable instructions that reside on the device, as will be discussed further below.

The device 110 may include one or more audio capture device(s), such as a microphone array 114 which may include a plurality of microphones. The audio capture device(s) may be integrated into a single device or may be separate. The device 110 may also include a built-in audio output device for producing sound, such as built-in loudspeaker(s) 220. The audio output device may be integrated into a single device or may be separate. The device 110 may include an address/data bus 924 for conveying data among components of the device 110. Each component within the device may also be directly connected to other components in addition to (or instead of) being connected to other components across the bus 824.

The device 110 may include one or more controllers/processors 804, which may each include a central processing unit (CPU) for processing data and computer-readable instructions, and a memory 806 for storing data and instructions. The memory 806 may include volatile random access memory (RAM), non-volatile read only memory (ROM), non-volatile magnetoresistive (MRAM) and/or other types of memory. The device 110 may also include a data storage component 808, for storing data and controller/processor-executable instructions (e.g., instructions to perform operations discussed herein). The data storage component 808 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 802.

Computer instructions for operating the device 110 and its various components may be executed by the controller(s)/processor(s) 804, using the memory 806 as temporary "working" storage at runtime. The computer instructions may be stored in a non-transitory manner in non-volatile memory 806, storage 808, or an external device. Alternatively, some or all of the executable instructions may be embedded in hardware or firmware in addition to or instead of software.

The device 110 may include input/output device interfaces 802. A variety of components may be connected through the input/output device interfaces 802, such as the microphone array 114, the built-in loudspeaker(s) 220, and a media source such as a digital media player (not illustrated). The input/output interfaces 802 may include A/D converters (not illustrated) and/or D/A converters (not illustrated).

The input/output device interfaces 802 may also include an interface for an external peripheral device connection such as universal serial bus (USB), FireWire, Thunderbolt or other connection protocol. The input/output device interfaces 802 may also include a connection to one or more networks 899 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 899, the device 110 may be distributed across a networked environment.

Multiple devices may be employed in a single device 110. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system.

Figure 9:
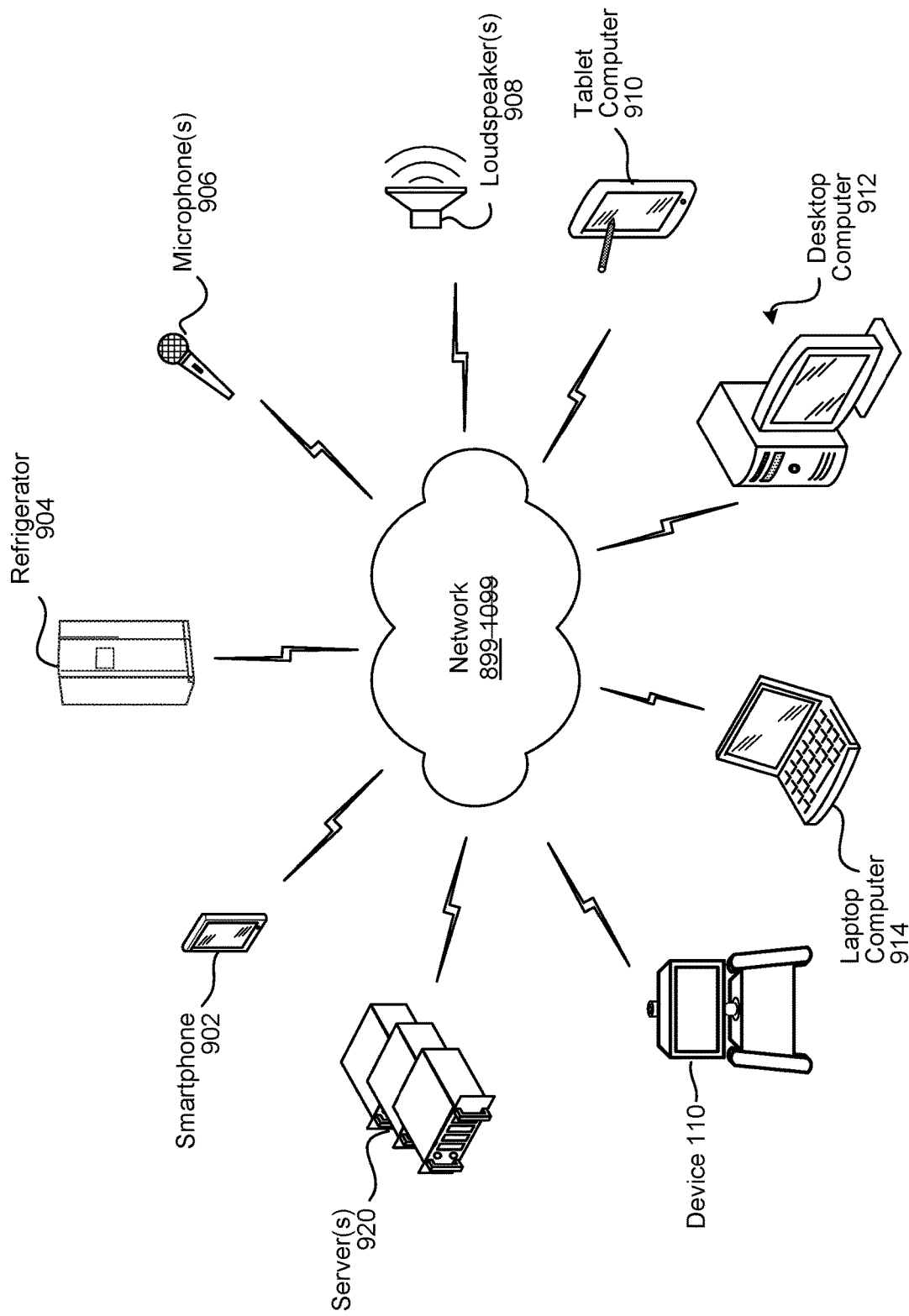
FIG. 9 illustrates a network including a system for beamforming using a device capable of moving a component according to embodiments of the present disclosure.

As illustrated in FIG. 9, the device 110 may be connected over a network(s) 899. The network(s) 899 may include a local or private network or may include a wide network such as the Internet. Devices may be connected to the network(s) 899 through either wired or wireless connections. For example, the device 110, a smart phone 902, a smart refrigerator 904, a wireless microphone 906, a wireless loudspeaker 908, a tablet computer 910, a desktop computer 912, and/or a laptop computer 914 may be connected to the network(s) 899 through a wireless service provider, over a WiFi or cellular network connection, or the like. Other devices are included as network-connected support devices, such as a server 920. The support devices may connect to the network(s) 899 through a wired connection or wireless connection.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the device 110 may be implemented by a digital signal processor (DSP).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving, from a microphone array of an autonomously motile device, first audio data;
    determining that a component of the autonomously motile device has moved from a first position to a second position;
    determining first data corresponding to the second position; and
    determining, using the first data and the first audio data, second audio data corresponding to a direction relative to the autonomously motile device.

2. The computer-implemented method of claim 1, further comprising:
    determining that the second audio data includes a representation of a wakeword; and
    based on determining that the second audio data includes the representation of the wakeword, causing speech processing to be performed using the second audio data.

3. The computer-implemented method of claim 1, further comprising:
    determining that the second position lies between a first predetermined position and a second predetermined position; and
    determining that the first data further correspond to one of the first predetermined position or the second predetermined position.

4. The computer-implemented method of claim 1, further comprising:
    determining that the second audio data includes a representation of an utterance;
    determining that a second direction relative to the autonomously motile device corresponds to a source of noise;
    determining second data corresponding to the second position;
    determining, using the second data, third audio data corresponding to the second direction; and
    determining speech audio data by processing the second audio data to remove at least a portion of the third audio data.

5. The computer-implemented method of claim 1, further comprising:
    while the component is disposed in the second position, determining second data corresponding to an audio processing component, the second data based at least in part on the first data and corresponding to an acoustic channel between the microphone array and a loudspeaker;
    outputting, using the loudspeaker, output audio corresponding to third audio data;
    processing, using the audio processing component and the second data, the third audio data to determine estimated audio data, the audio processing component corresponding to an estimate of the acoustic channel between the microphone array and the loudspeaker; and
    subtracting at least a portion of the estimated audio data from the second audio data to determine output audio data.

6. The computer-implemented method of claim 5, further comprising:
    prior to processing the third audio data, determining third data corresponding to the audio processing component, the third data based at least in part on the second data; and
    determining that a difference between a first value of the second data and a second value of the third data is less than a threshold.

7. The computer-implemented method of claim 1, wherein the first data comprises filter coefficients that are determined based at least in part on one of:
    a finite-element analysis of a three-dimensional (3D) representation of the autonomously motile device having the component disposed at the second position; or
    a boundary-element analysis of the 3D representation of the autonomously motile device having the component disposed at the second position.

8. The computer-implemented method of claim 7, further comprising:
    receiving, using the 3D representation, a first representation of first audio having a first frequency;
    receiving, using the 3D representation, a second representation of second audio having a second frequency;
    determining, using the first representation, a normalization factor that, when multiplied with or divided into a value of the first representation, generates a value of 1.0; and
    determining, using the normalization factor and the second representation, normalized data, wherein the filter coefficients are based at least in part on the first representation and the normalized data.

9. The computer-implemented method of claim 1, further comprising:
attenuating a first portion of the second audio data to generate attenuated second audio data, the first portion corresponding to an audio artifact; and
sending, to a speech-processing system, the attenuated second audio data.

10. The computer-implemented method of claim 1, wherein at least one microphone of the microphone array is located on the component.

11. The computer-implemented method of claim 1, wherein first data comprises filter coefficients.

12. The computer-implemented method of claim 1, wherein the component comprises a mast.

13. A system comprising:
at least one processor; and
at least one memory including instructions that, when executed by the at least one processor, cause the system to:
receive, from a microphone array of an autonomously motile device, first audio data;
determine that a position of a component of the autonomously motile device has moved from a first position to a second position;
determine first data corresponding to the second position; and
determine, using the first data and the first audio data, second audio data corresponding to a direction relative to the autonomously motile device.

14. The system of claim 13, wherein the at least one memory further comprises instructions that, when executed by the at least one processor, further cause the system to:
determine that the second audio data includes a representation of a wakeword; and
based on determining that the second audio data includes the representation of the wakeword, cause speech processing to be performed using the second audio data.

15. The system of claim 13, wherein the at least one memory further comprises instructions that, when executed by the at least one processor, further cause the system to:
determine that the second position lies between a first predetermined position and a second predetermined position; and
determine that the first data further correspond to one of the first predetermined position and the second predetermined position.

16. The system of claim 13, wherein the at least one memory further comprises instructions that, when executed by the at least one processor, further cause the system to:
determine that the second audio data includes a representation of an utterance;
determine that a second direction relative to the autonomously motile device corresponds to a source of noise;
determine second data corresponding to the second position;
determine, using the second data, third audio data corresponding to the second direction;
and determine speech audio data by processing the second audio data to remove at least a portion of the third audio data.

17. The system of claim 13, wherein the at least one memory further comprises instructions that, when executed by the at least one processor, further cause the system to:
while the component is disposed in the second position, determine second data corresponding to an audio processing component, the second data based at least in part on the first data and corresponding to an acoustic channel between the microphone array and a loudspeaker;
output, using the loudspeaker, output audio corresponding to third audio data;
process, using the audio processing component and the second data, the third audio data to determine estimated audio data, the audio processing component corresponding to an estimate of the acoustic channel between the microphone array and the loudspeaker; and
subtract at least a portion of the estimated audio data from the second audio data to determine output audio data.

18. The system of claim 17, wherein the at least one memory further comprises instructions that, when executed by the at least one processor, further cause the system to:
prior to processing the third audio data, determine third data corresponding to the audio processing component, the third data based at least in part on the second data; and
determine that a difference between a first value of the second data and a second value of the third data is less than a threshold.

19. The system of claim 13, wherein the first data comprises filter coefficients that are based at least in part on one of:
a finite-element analysis of a three-dimensional (3D) representation of the autonomously motile device having the component disposed at the second position; or
a boundary-element analysis of the 3D representation of the autonomously motile device having the component disposed at the second position.

20. The system of claim 19, wherein the at least one memory further comprises instructions that, when executed by the at least one processor, further cause the system to:
receive, using the 3D representation, a first representation of first audio having a first frequency;
receive, using the 3D representation, a second representation of second audio having a second frequency;
determine, using the first representation, a normalization factor that, when multiplied with or divided into a value of the first representation, generates a value of 1.0; and
determine, using the normalization factor and the second representation, normalized data, wherein the filter coefficients are based at least in part on the first representation and the normalized data.

21. The system of claim 13, wherein the at least one memory further comprises instructions that, when executed by the at least one processor, further cause the system to:
attenuate a first portion of the second audio data to generate attenuated second audio data, the first portion corresponding to an audio artifact; and
send, to a speech-processing system, the attenuated second audio data.

22. A computer-implemented method comprising:
receiving first audio data;
determining that a component of an autonomously motile device has moved from a first position to a second position;
determining first data corresponding to the second position; and
determining, using the first data and the first audio data, second audio data.

23. A computer-implemented method comprising:
receiving, from a microphone array of a device, first audio data;
determining that a component of the device has moved from a first position to a second position;

determining first data corresponding to the second position; and determining, using the first data and the first audio data, second audio data corresponding to a direction relative to the device.

* * * * *